United States Patent
Siomina et al.

(10) Patent No.: US 10,834,623 B2
(45) Date of Patent: Nov. 10, 2020

(54) METHODS FOR REFERENCE DETERMINATION IN INTER-RAT TDOA

(71) Applicant: Telefonaktiebolaget LM Ericsson (publ), Stockholm (SE)

(72) Inventors: Iana Siomina, Täby (SE); Fredrik Gunnarsson, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 59 days.

(21) Appl. No.: 16/303,042

(22) PCT Filed: Oct. 10, 2018

(86) PCT No.: PCT/SE2018/051040
§ 371 (c)(1),
(2) Date: Nov. 19, 2018

(87) PCT Pub. No.: WO2019/074435
PCT Pub. Date: Apr. 18, 2019

(65) Prior Publication Data
US 2020/0092737 A1    Mar. 19, 2020

Related U.S. Application Data

(60) Provisional application No. 62/572,176, filed on Oct. 13, 2017.

(51) Int. Cl.
*H04W 24/10*    (2009.01)
*H04W 36/30*    (2009.01)
(Continued)

(52) U.S. Cl.
CPC .......... *H04W 24/10* (2013.01); *G01S 5/0236* (2013.01); *H04L 1/0693* (2013.01); *H04W 4/025* (2013.01);
(Continued)

(58) Field of Classification Search
CPC ... H04W 24/10; H04W 36/305; H04W 4/025; H04W 8/24; H04W 36/06; H04W 36/08;
(Continued)

(56) References Cited

U.S. PATENT DOCUMENTS 9,723,437 B1 *  8/2017  Bitra ................. H04W 4/90
2011/0143774 A1 *  6/2011  McNamara .......... H04W 4/029
455/456.2

(Continued)

FOREIGN PATENT DOCUMENTS

WO     2012096608 A1    7/2012

OTHER PUBLICATIONS

3GPP, "3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 14)", 3GPP TS 36.305 V14.3.0, Sep. 2017, 1-78.

(Continued)

*Primary Examiner* — Devan A Sandiford
(74) *Attorney, Agent, or Firm* — Murphy, Bilak & Homiller, PLLC

(57) ABSTRACT

A wireless device adapted for operation according to two or more radio access technologies, RATs, obtains positioning reference signal configuration information by sending (602), to a location server, a request for assistance, the request for assistance comprising information about a cell serving the wireless device according to a first RAT. The wireless device receives (604), in response to the request for assistance, positioning reference signal configuration information, the positioning reference signal configuration information identifying one or more signals transmitted according to a second RAT, for measurement by the wireless device. The wireless device measures (606) at least one of the identified (Continued)

one or more signals and may report the measurements and/or estimate a location for the wireless device based on the measurements.

26 Claims, 19 Drawing Sheets

(51) Int. Cl.
  *G01S 5/02* (2010.01)
  *H04L 1/06* (2006.01)
  *H04W 4/02* (2018.01)
  *H04W 8/24* (2009.01)
  *H04W 36/06* (2009.01)
  *H04W 36/08* (2009.01)
  *H04W 64/00* (2009.01)
  *H04W 72/04* (2009.01)
(52) U.S. Cl.
  CPC ............ *H04W 8/24* (2013.01); *H04W 36/06* (2013.01); *H04W 36/08* (2013.01); *H04W 36/305* (2018.08); *H04W 64/003* (2013.01); *H04W 72/0433* (2013.01); *H04W 72/0453* (2013.01)
(58) Field of Classification Search
  CPC ........... H04W 64/003; H04W 72/0433; H04W 72/0453; H04W 64/00; H04W 4/029; H04W 4/023; H04W 4/90; H04W 4/02; G01S 5/0236; H04L 1/0693
  See application file for complete search history.

(56) References Cited

U.S. PATENT DOCUMENTS

| | | | | |
|---|---|---|---|---|
| 2011/0212733 | A1* | 9/2011 | Edge ..................... | G01S 5/0036 455/456.1 |
| 2012/0040687 | A1* | 2/2012 | Siomina ................ | G01S 5/0205 455/456.1 |
| 2012/0214512 | A1* | 8/2012 | Siomina ................ | G01S 5/0205 455/456.2 |
| 2012/0264449 | A1* | 10/2012 | Kazmi .................. | H04W 24/10 455/456.1 |
| 2013/0064219 | A1* | 3/2013 | Siomina ................ | H04W 64/00 370/331 |
| 2014/0286192 | A1* | 9/2014 | Wei ....................... | H04W 48/08 370/254 |

OTHER PUBLICATIONS

3GPP, "3rd Generation Partnership Project; Technical Specification Group Services and System Aspects; General Packet Radio Service (GPRS) enhancements for Evolved Universal Terrestrial Radio Access Network (E-UTRAN) access (Release 14)", 3GPP TS 23.401 V14.5.0, Sep. 2017, 1-393.

3GPP, "3rd Generation Partnership Project; Technical Specification Group Core Network and Terminals; Location Services (LCS); Evolved Packet Core (EPC) LCS Protocol (ELP) between the Gateway Mobile Location Centre (GMLC) and the Mobile Management Entity (MME); SL", 3GPP TS 29.172 V14.1.0, Jun. 2017, pp. 1-43.

3GPP, "3rd Generation Partnership Project; Technical Specification Group Core Network and Terminals; Location Services (LCS); LCS Application Protocol (LCS-AP) between the Mobile Management Entity (MME) and Evolved Serving Mobile Location Centre (E-SMLC); SLs int", 3GPP TS 29.171 V14.1.0, Jun. 2017, pp. 1-55.

3GPP, "3rd Generation Partnership Project; Technical Specification Group Radio Access Network; Evolved Universal Terrestrial Radio Access (E-UTRA); LTE Positioning Protocol (LPP) (Release 14)", 3GPP TS 36.355 V14.2.0, Jun. 2017, pp. 1-167.

3GPP, "3rd Generation Partnership Project; Technical Specification Group Radio Access Network; Evolved Universal Terrestrial Radio Access (E-UTRA); LTE Positioning Protocol A (LPPa) (Release 14)", 3GPP TS 36.455 V14.2.0, Jun. 2017, pp. 1-74.

3GPP, "3rd Generation Partnership Project; Technical Specification Group Radio Access Network; Evolved Universal Terrestrial Radio Access (E-UTRA); Radio Resource Control (RRC); Protocol specification (Release 14)", 3GPP TS 36.331 V14.3.0, Jun. 2017, pp. 1-745.

3GPP, "3rd Generation Partnership Project; Technical Specification Group Radio Access Network; Evolved Universal . Terrestrial Radio Access Network (E-UTRAN); Stage 2 functional specification of User Equipment (UE) positioning in E-UTRAN (Release 14)", 3GPP TS 36.305 V14.2.0, Jun. 2017, pp. 1-78.

3GPP, "3rd Generation Partnership Project; Technical Specification Group Services and System Aspects; General Packet Radio Service (GPRS) enhancements for Evolved Universal Terrestrial Radio Access Network (E-UTRAN) access (Release 14)", 3GPP TS 23.401 V14.4.0, Jun. 2017, pp. 1-386.

* cited by examiner

600

SEND, TO A LOCATION SERVER, A REQUEST FOR ASSISTANCE, THE REQUEST FOR ASSISTANCE INCLUDING INFORMATION DESCRIBING AT LEAST ONE CELL MONITORED BY THE WIRELESS DEVICE, OR INCLUDING INFORMATION ABOUT THE WIRELESS DEVICE'S CAPABILITY TO MEASURE OR PREFERENCE FOR MEASURING SIGNALS TRANSMITTED ACCORDING TO EACH OF ONE OR MORE RADIO ACCESS TECHNOLOGIES (RATS), OR INCLUDING BOTH SAID INFORMATION DESCRIBING THE AT LEAST ONE MONITORED CELL AND SAID INFORMATION ABOUT THE WIRELESS DEVICE'S CAPABILITY
602

RECEIVE, IN RESPONSE TO THE REQUEST FOR ASSISTANCE, POSITIONING REFERENCE SIGNAL CONFIGURATION INFORMATION, THE POSITIONING REFERENCE SIGNAL CONFIGURATION INFORMATION IDENTIFYING ONE OR MORE SIGNALS FOR MEASUREMENT BY THE WIRELESS DEVICE
604

MEASURE AT LEAST ONE OF THE IDENTIFIED ONE OR MORE SIGNALS
606

802
RECEIVE, FROM THE WIRELESS DEVICE, A REQUEST FOR ASSISTANCE, THE REQUEST FOR ASSISTANCE INCLUDING INFORMATION DESCRIBING AT LEAST ONE CELL MONITORED BY THE WIRELESS DEVICE, OR INCLUDING INFORMATION ABOUT THE WIRELESS DEVICE'S CAPABILITY TO MEASURE OR PREFERENCE FOR MEASURING SIGNALS TRANSMITTED ACCORDING TO EACH OF ONE OR MORE RADIO ACCESS TECHNOLOGIES (RATS), OR INCLUDING BOTH SAID INFORMATION DESCRIBING THE AT LEAST ONE MONITORED CELL AND SAID INFORMATION ABOUT THE WIRELESS DEVICE'S CAPABILITY

804
SEND TO THE WIRELESS DEVICE, IN RESPONSE TO THE REQUEST FOR ASSISTANCE, POSITIONING REFERENCE SIGNAL CONFIGURATION INFORMATION, THE POSITIONING REFERENCE SIGNAL CONFIGURATION INFORMATION IDENTIFYING ONE OR MORE SIGNALS FOR MEASUREMENT BY THE WIRELESS DEVICE

*FIG. 8*

METHODS FOR REFERENCE DETERMINATION IN INTER-RAT TDOA

TECHNICAL FIELD

The present disclosure generally relates to the field of wireless network communications, and more particularly, to a location server providing and a wireless device obtaining positioning reference signal configuration information.

BACKGROUND

Evolved Packet System (EPS) is the Evolved 3GPP Packet Switched Domain and includes Evolved Packet Core (EPC) and Evolved Universal Terrestrial Radio Access Network (E-UTRAN). The EPC architecture is defined in 3GPP TS 23.401, which provides definitions of the PGW (PDN Gateway), SGW (Serving Gateway), PCRF (Policy and Charging Rules Function), MME (Mobility Management Entity), and mobile device (UE). A Long-Term Evolution (LTE) radio access network (E-UTRAN) as specified by members of the $3^{th}$-Generation Partnership Project (3GPP) includes one or more eNBs (3GPP terminology for base stations in LTE networks; also referred to as eNodeBs). The eNBs are interconnected with each other by means of an X2 interface. The eNBs are also connected by means of an S1 interface to the EPC (Evolved Packet Core), more specifically to the MME (Mobility Management Entity) by means of the S1-MME interface and to the Serving Gateway (S-GW) by means of the S1-U interface.

Location-based services and emergency call positioning drive the development of positioning in wireless networks and a plethora of applications and services in terminals take advantage of the position. Positioning in LTE is supported by the architecture in FIG. 1, with direct interactions between a UE (user equipment—3GPP terminology for an access terminal, such as a mobile telephone or a machine-to-machine wireless communications device) and a location server (E-SMLC) via the LTE Positioning Protocol (LPP). Moreover, there are also interactions between the location server and the eNB via the LPP-Annex (LPPa) protocol, to some extent supported by interactions between the e and the UE via the Radio Resource Control (RRC) protocol. The positioning is initiated via interaction with the MME, where the initiation can be from the UE, the E-SMLC and the Gateway Mobile Location Center (GMLC).

FIG. 2 illustrates the 5G or New Radio (NR) positioning architecture, where the Access and Mobility Function (AMF) has a role similar to the MME, the Location Management Function (LMF) has a role similar to E-SMLC, and NG-RAN is in this view a generic name for radio network infrastructure. In addition, there is the Unified Data Management (UDM) and the Location Retrieval Function (LRF), which are part of the architecture, but not central to the radio related aspect in this invention.

Several positioning techniques are considered in LTE, as discussed, for example, in 3GPP TS 36.305. These include Enhanced Cell ID. Essentially, cell ID information is used to associate the UE with the serving area of a serving cell, and then additional information is used to determine a finer granularity position. Another technique includes assisted GNSS (global navigation satellite system), where GNSS information is retrieved by the UE and supported by assistance information provided to the UE from E-SMLC.

Other positioning systems include OTDOA (Observed Time Difference of Arrival), where the UE estimates the time difference of reference signals from different base stations and sends it to the E-SMLC for multilateration, and UTDOA (Uplink TDOA), where the UE is requested to transmit a specific waveform that is detected by multiple location measurement units (e.g., an eNB) at known positions. These measurements are forwarded to E-SMLC for multilateration.

FIG. 3 illustrates a general scenario with a UE, served by one RAT, that is requested to provide measurements at another RAT. In this general scenario, a UE 10 is served/controlled by a serving/controlling node/base station 20. In 5G, this node is labeled gNB. A UE may also have more than one serving cell. For example, in a carrier aggregation system, a UE may have a primary cell (PCell) and one or more secondary cells (SCells). With dual connectivity, a UE may have PCell and PSCell and may also have a SCell, where the serving cells may or may not belong to the same RAT. For instance, in non-standalone NR, a UE may be served by LTE PCell, NR PSCell, and possibly also LTE and/or NR SCells. In addition, there are LTE base stations/eNBs 30 in the area, transmitting positioning reference signals. The UE is also supported by a location server (LS) 40, which is realized as a E-SMLC in EPC and as LMF in 5G Core (5GC). The base stations may transmit reference signals that the UE can detect and measure an associated time of arrival (TOA).

In an example, the positioning technique is OTDOA, which is a UE-assisted method in which the UE measures the TOA of specific positioning reference signals (PRS) from multiple cells (eNBs) and computes the relative differences between each cell and a reference cell. These reference signal time differences (RSTD) are quantized and reported via LTE Positioning Protocol (LPP) to the E-SMLC together with an accuracy assessment. Based on known positions of eNBs and their mutual time synchronization, it is possible for the E-SMLC to estimate the UE position from the RSTD and covariance reports using multilateration. The accuracy depends on the radio conditions of the received signals, number of received signals, as well as the deployment, which means that it will vary spatially. FIG. 4 illustrates the multilateration in OTDOA, when considering eNB1 as the reference cell.

The positioning reference signals may be transmitted in the same carrier which the UE is currently operating on or carriers the UE is configured to use for communication, or at a different carrier. In the case where the UE is configured to measure a positioning reference signal at a different carrier, it can inform the serving eNB in order to obtain a measurement gap configuration, where the UE will leave a serving carrier to search for a positioning reference signal at a different carrier. The interactions with the serving eNB can be via the Radio Resource Control (RRC) protocol. In the existing LTE specification, the UE informs the serving eNB about the configured transmission pattern when the positioning reference signal is being transmitted (typically periodic) and the frequency carrier.

Before the network node and the device in LTE start to communicate with each other, the UE needs to know the timing of the corresponding cell, including the System Frame Number (SFN) information. A UE performs cell search, acquires the cell timing, and also adjusts its own timing for receptions but also for its transmissions. In LTE, a radio frame, or system frame (numbered with SFN), has a 10-millisecond length, and the corresponding SFN can be an integer between 0 and 1023. A subframe has a 1-millisecond length and the corresponding subframe number is an integer between 0 and 9. One radio frame comprises 10 subframes. Each subframe comprises 2 slots.

In the existing solution for devices served in NR/5G, the current agreement is to reuse existing LPP. However, LPP is not designed to support devices served by a non-LTE RAT while measuring LTE signals. LPP does not support, in general, devices served by one RAT and receiving radio signals for positioning purpose in another, different, RAT, or served by at least a first RAT and a second RAT (e.g., in carrier aggregation or dual connectivity with LTE and NR), while receiving radio signals for positioning purpose in a third RAT different from the first or second RAT in which the UE receives assistance data.

SUMMARY

Embodiments of the present invention address the issues described above by having, for example, the target wireless device (e.g., UE) provide information to a location server when there may be serving base stations from more than one RAT, and/or when there is more than one possible RAT that can provide positioning reference signals. The wireless device then receives positioning reference signal configuration information from the location server based on the information.

According to some embodiments, a wireless device adapted for operation according to two or more radio access technologies (RATs) obtains positioning reference signal configuration information by sending, to a location server, a request for assistance, the request for assistance comprising information about a cell serving the wireless device according to a first RAT. The wireless device receives, in response to the request for assistance, positioning reference signal configuration information, the positioning reference signal configuration information identifying one or more signals transmitted according to a second RAT, for measurement by the wireless device. The wireless device measures at least one of the identified one or more signals and may report the measurements and/or estimate a location for the wireless device based on the measurements.

According to other embodiments, a location server configured to provide positioning reference signal configuration information to a wireless device receives, from the wireless device, a request for assistance, the request for assistance including information comprising information about a cell serving the wireless device according to a first radio access technology (RAT). The location server sends to the wireless device, in response to the request for assistance, positioning reference signal configuration information, the positioning reference signal configuration information identifying one or more signals transmitted according to a second RAT, for measurement by the wireless device. The location server may receive a report of or more measurements of the identified one or more signals, and may, in some embodiments, estimate a location for the wireless device based on the report.

According to some embodiments, a method carried out by a wireless device, for obtaining positioning reference signal configuration information, includes sending, to a location server, a request for assistance. The request for assistance includes information describing at least one cell monitored by the wireless device, or includes information about the wireless device's capability to measure or preference for measuring signals transmitted according to each of one or more RATs, or includes both the information describing the at least one monitored cell and the information about the wireless device's capability. The method also includes receiving, in response to the request for assistance, positioning reference signal configuration information. The positioning reference signal configuration information identifies one or more signals for measurement by the wireless device. The method further includes measuring at least one of the identified one or more signals.

According to some embodiments, a method, in a location server, for providing positioning reference signal configuration information to a wireless device, includes receiving, from the wireless device, a request for assistance. The request for assistance includes information describing at least one cell monitored by the wireless device, or includes information about the wireless device's capability to measure or preference for measuring signals transmitted according to each of one or more RATs, or includes both the information describing the at least one monitored cell and the information about the wireless device's capability. The method also includes sending to the wireless device, in response to the request for assistance, positioning reference signal configuration information. The positioning reference signal configuration information identifies one or more signals for measurement by the wireless device.

According to some embodiments, a wireless device configured to obtain positioning reference signal configuration information includes transceiver circuitry, configured for communicating directly or indirectly with a location server and one or more wireless communication networks, and processing circuitry operatively associated with the transceiver circuitry. The processing circuitry is configured to send, to the location server, a request for assistance. The request for assistance includes information describing at least one cell monitored by the wireless device, or includes information about the wireless device's capability to measure or preference for measuring signals transmitted according to each of one or more RATs, or includes both said information describing the at least one monitored cell and said information about the wireless device's capability. The processing circuitry is configured to receive, in response to the request for assistance, positioning reference signal configuration information. The positioning reference signal configuration information identifies one or more signals for measurement by the wireless device. The processing circuitry is also configured to measure at least one of the identified one or more signals.

According to some embodiments, a location server configured to provide positioning reference signal configuration information to a wireless device includes communication circuitry configured for communicating directly or indirectly with the wireless device and processing circuitry operatively associated with the communication circuitry. The processing circuitry is configured to receive, from the wireless device, a request for assistance. The request for assistance includes information describing at least one cell monitored by the wireless device, or includes information about the wireless device's capability to measure or preference for measuring signals transmitted according to each of one or more RATs, or includes both the information describing the at least one monitored cell and the information about the wireless device's capability. The processing circuitry is also configured to send to the wireless device, in response to the request for assistance, positioning reference signal configuration information. The positioning reference signal configuration information identifying one or more signals for measurement by the wireless device.

Further aspects of the present invention are directed to an apparatus, computer program products or computer readable storage medium corresponding to the methods summarized above and functional implementations of the above-summarized apparatus and wireless device.

Of course, the present invention is not limited to the above features and advantages. Those of ordinary skill in the art will recognize additional features and advantages upon reading the following detailed description, and upon viewing the accompanying drawings.

BRIEF DESCRIPTION OF THE FIGURES

FIG. 6 illustrates a flow diagram of a method by the wireless device, according to some embodiments.

FIG. 8 illustrates a flow diagram of a method by the location server, according to some embodiments.

DETAILED DESCRIPTION OF EMBODIMENTS

Exemplary embodiments of the present disclosure will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment can be tacitly assumed to be present/used in another embodiment.

Embodiments of the present invention involve a target wireless device (e.g., UE) that sends information to a location server about, for example, the serving RAT and what RATs the target device can handle, and in return obtains information about positioning reference signal configurations. Measurements are performed for signals identified by the obtained information.

Figure 1:
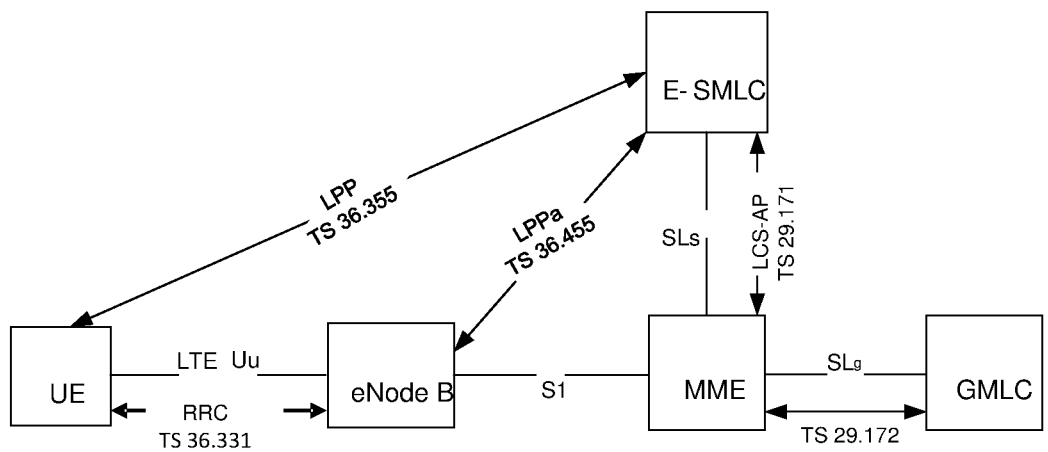
FIG. 1 illustrates an LTE positioning architecture.
Figure 2:
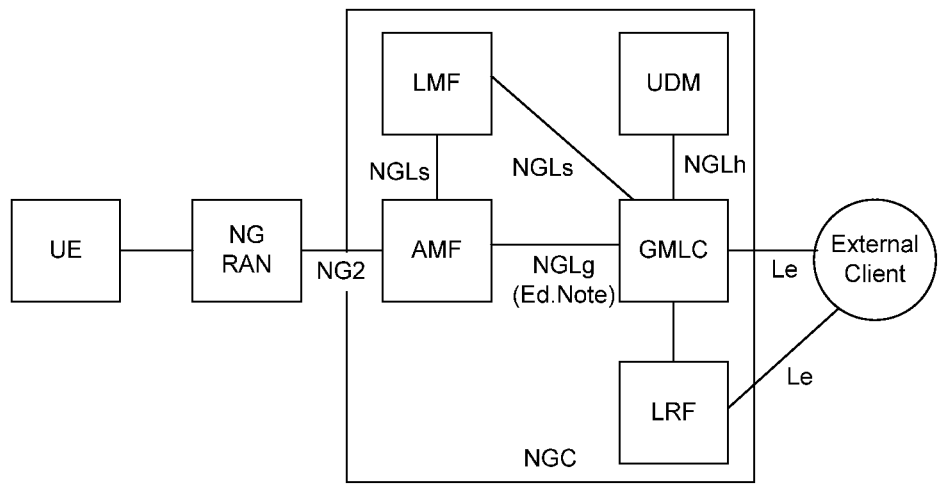
FIG. 2 illustrates a 5G positioning architecture.
Figure 3:
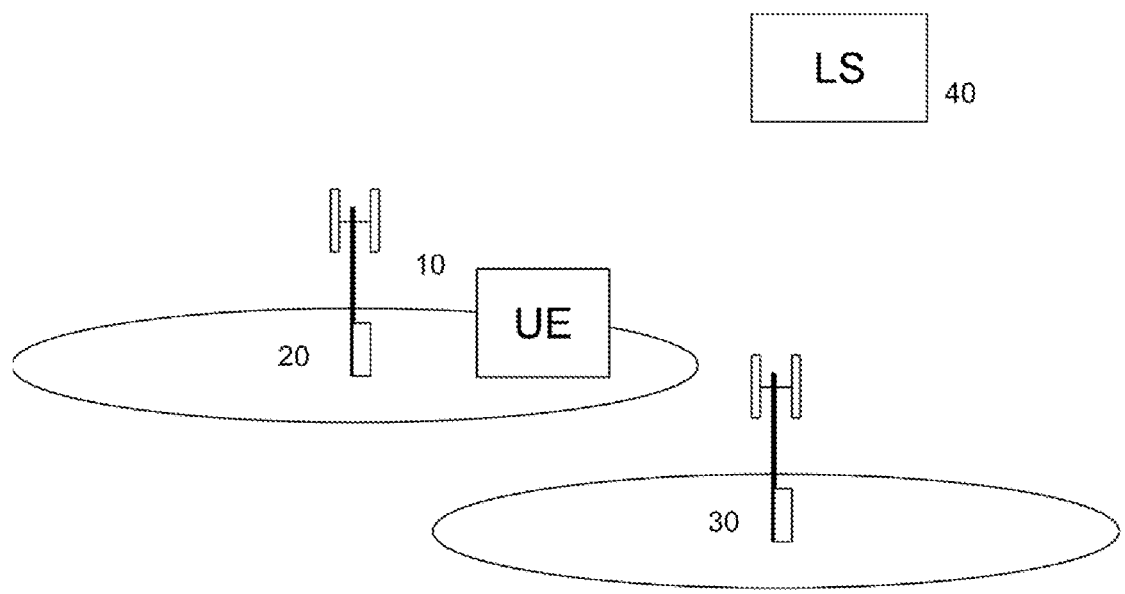
FIG. 3 illustrates a general scenario with a UE served by one RAT that is requested to provide measurements at another RAT.
Figure 4:
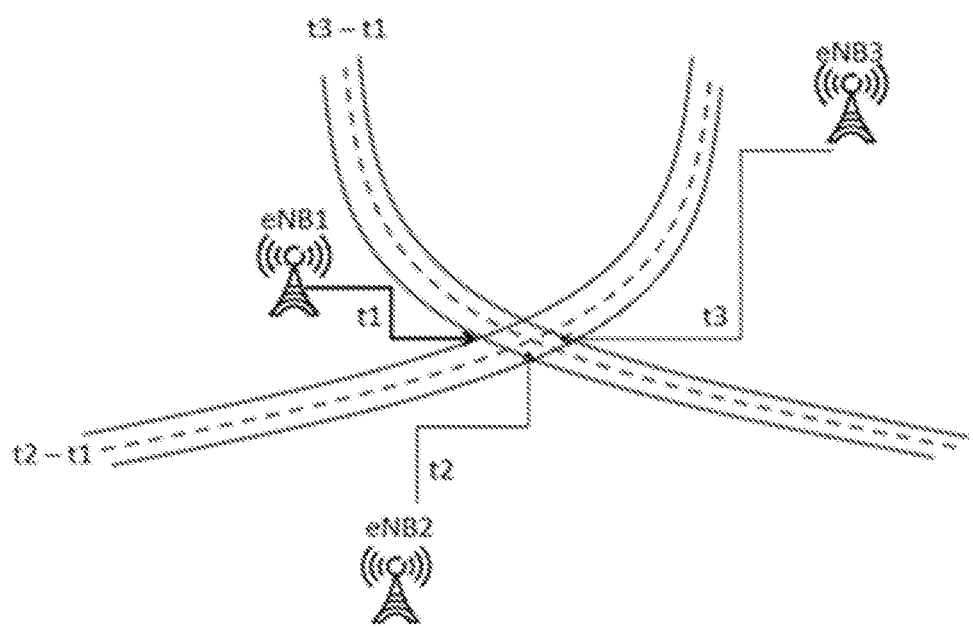
FIG. 4 illustrates OTDOA position estimation based on multilateration of RSTD measurements.
Figure 5:
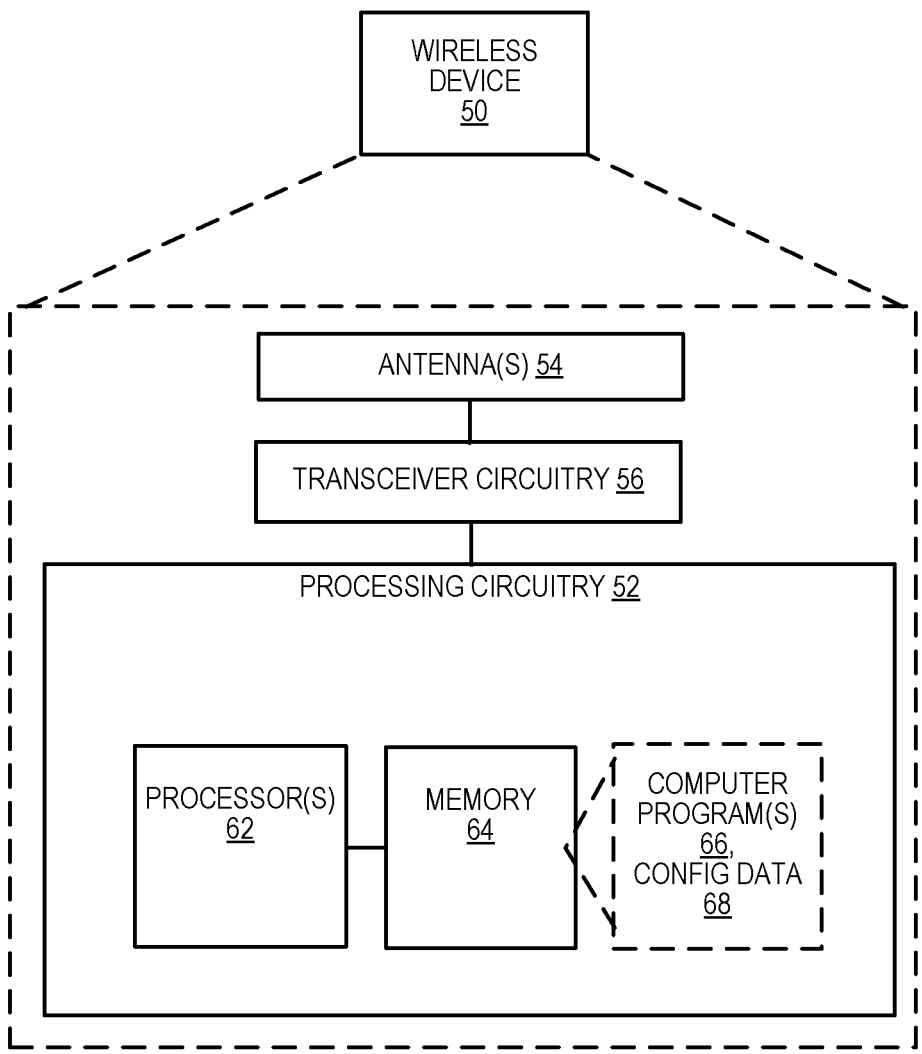
FIG. 5 illustrates is a block diagram of a wireless device, according to some embodiments.

In an example, FIG. 5 illustrates a diagram of a wireless device, shown as wireless device 50, according to some embodiments. The wireless device 50 may be considered to represent any wireless terminals that may operate in a network, such as a UE in a cellular network. Other examples may include a communication device, target device, device to device (D2D) UE, machine type UE or UE capable of machine to machine communication (M2M), a sensor equipped with UE, PDA (personal digital assistant), Tablet, mobile terminal, smart phone, laptop embedded equipped (LEE), laptop mounted equipment (LME), USB dongles, Customer Premises Equipment (CPE), etc.

The wireless device 50 is configured to communicate with a radio network node or base station in a wide-area cellular network via antennas 54 and transceiver circuitry 56. The transceiver circuitry 56 may include transmitter circuits, receiver circuits, and associated control circuits that are collectively configured to transmit and receive signals according to a radio access technology, for the purposes of using cellular communication services. This radio access technologies are NR and LTE for the purposes of this discussion.

The wireless device 50 also includes one or more processing circuits 52 that are operatively associated with the radio transceiver circuitry 56. The processing circuitry 52 comprises one or more digital processing circuits, e.g., one or more microprocessors, microcontrollers, Digital Signal Processors (DSPs), Field Programmable Gate Arrays (FPGAs), Complex Programmable Logic Devices (CPLDs), Application Specific Integrated Circuits (ASICs), or any mix thereof. More generally, the processing circuitry 52 may comprise fixed circuitry, or programmable circuitry that is specially adapted via the execution of program instructions implementing the functionality taught herein or may comprise some mix of fixed and programmed circuitry. The processing circuitry 52 may be multi-core.

The processing circuitry 52 also includes a memory 64. The memory 64, in some embodiments, stores one or more computer programs 66 and, optionally, configuration data 68. The memory 64 provides non-transitory storage for the computer program 66 and it may comprise one or more types of computer-readable media, such as disk storage, solid-state memory storage, or any mix thereof. Here, "non-transitory" means permanent, semi-permanent, or at least temporarily persistent storage and encompasses both long-term storage in non-volatile memory and storage in working memory, e.g., for program execution. By way of non-limiting example, the memory 64 comprises any one or more of SRAM, DRAM, EEPROM, and FLASH memory, which may be in the processing circuitry 52 and/or separate from processing circuitry 52. The memory 64 may also store any configuration data 68 used by the wireless device 50. The processing circuitry 52 may be configured, e.g., through the use of appropriate program code stored in memory 64, to carry out one or more of the methods and/or signaling processes detailed hereinafter.

The processing circuitry 52 of the wireless device 50 is configured, according to some embodiments, to cause the wireless device 50 to obtain positioning reference signal configuration information. The processing circuitry 52 is configured to send, to a location server, a request for assistance. The request for assistance includes information describing at least one cell monitored by the wireless device or includes information about the wireless device's capability to measure or preference for measuring signals transmitted according to each of one or more RATs or includes both the information describing the at least one monitored cell and the information about the wireless device's capability. The processing circuitry 52 is also configured to receive, in response to the request for assistance, positioning reference signal configuration information. The positioning reference signal configuration information identifies one or more signals for measurement by the wireless device. The processing circuitry 52 is configured to also measure at least one of the identified one or more signals.

The processing circuitry 52 is also configured to perform a corresponding method 600, shown in FIG. 6. The method 600 includes sending, to a location server, a request for assistance (block 602), which may include the information described above. The method 600 also includes receiving, in response to the request for assistance, positioning reference signal configuration information (block 604). As explained above, the positioning reference signal configuration information identifies one or more signals for measurement by the wireless device. The method 600 further includes measuring at least one of the identified one or more signals (block 606).

The method 600 may include reporting one or more measurements for the measured signal or signals and/or estimating a location for the wireless device, based on one or more measurements for the measured signal or signals.

In some cases, the method 600 includes receiving, prior to the sending, a request for positioning capability information for the wireless device and sending, in response to the request for positioning capability information, positioning capability information for the wireless device. The positioning capability information may indicate the wireless device's capability to measure or preference for measuring signals according to each of one or more RATs. The positioning capability information may include: a current wireless device configuration with respect to multi-RAT operation; an indication of one or more RATs according to which the wireless device is capable of receiving or prefers to receive positioning assistance data; an indication of one or more RATs according to which the wireless device is capable of reporting or prefers to report results of positioning measurements; an indication of one or more RATs for which the wireless device has a primary cell configured; an indication of whether the wireless device is capable of and/or prefers performing positioning measurements of signals according to multiple RATs in parallel; an indication of a maximum number of cells and/or frequencies for positioning measurements according to each of one or more of supported RATs; an indication of a set or a range of carrier frequencies for positioning measurements according to each of one or more of supported RATs; an indication of supported bandwidth(s) according to each of one or more of supported RATs; and/or an indication of the wireless device's numerology capability with respect to each of one or more supported RATs.

The wireless device may be served by a primary cell operating according to a first RAT, and the method 600 may include identifying a strongest cell operating according to a second RAT, differing from the first RAT. The request for assistance may include information identifying the identified strongest cell operating according to the second RAT. The method 600 may further include establishing a measurement gap for monitoring signals according to the second RAT, prior to identifying the strongest cell. This establishing of the measurement gap may include requesting a measurement gap, via the primary cell in the first RAT, or autonomously setting up the measurement gap.

In some cases, the request for assistance may include information describing a primary cell serving the wireless device according to a first RAT. This information may include: a cell identifier for the primary cell; a carrier frequency for the primary cell; a frequency of a serving synchronization signal block (serving SSB); an identifier of an SSB; a tracking reference signal identifier; an identifier of a channel-state information reference signal; and timing information for the primary cell.

The request for assistance may include information describing one or more cells serving the wireless device other than a primary cell serving the wireless device. The positioning reference signal configuration information may include timing information for one or more of the identified signals for measurement by the wireless device. The measurement by the wireless device of the at least one of the identified one or more signals may include using the timing information.

Figure 7:
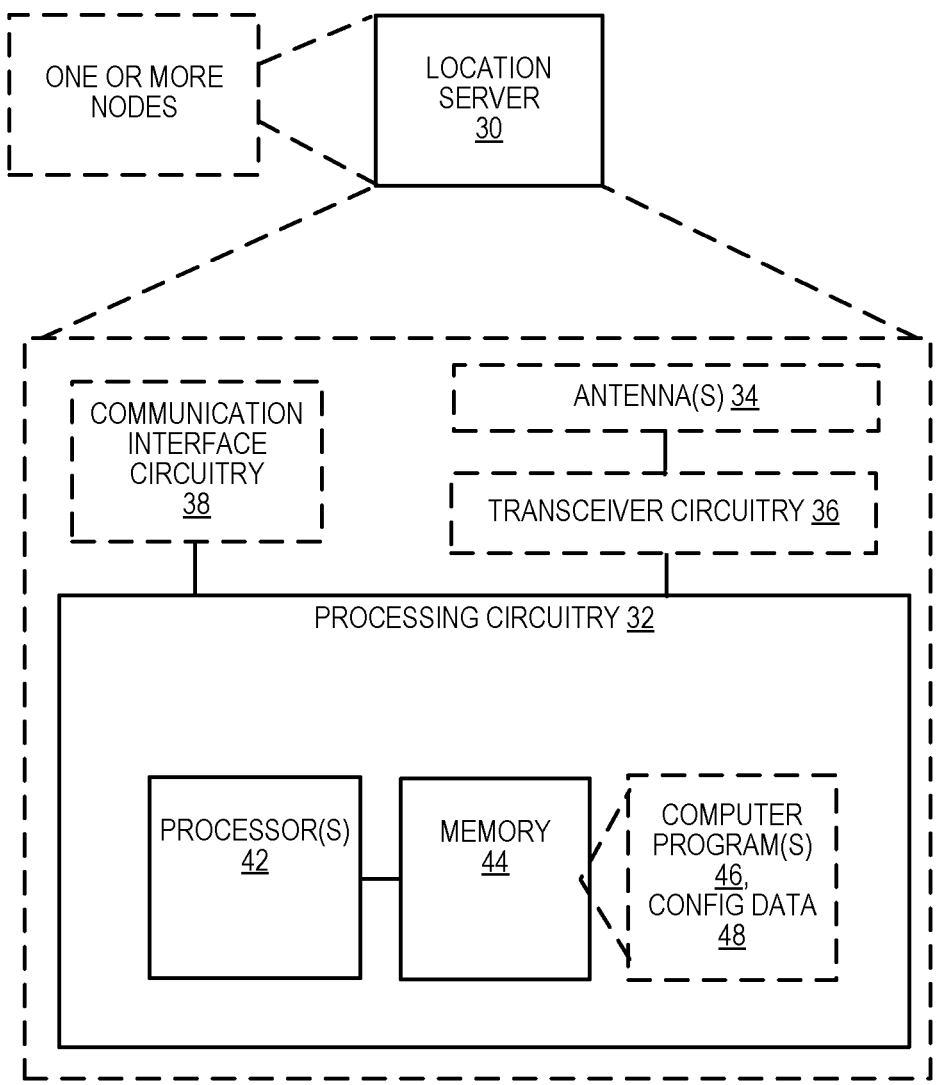
FIG. 7 is a block diagram of a location server, according to some embodiments.

Correspondingly, FIG. 7 illustrates a diagram of a location server, shown as location server 30, that may be configured to provide positioning reference signal configuration information to a wireless device. The location server 30, or at least its functionality, may be located in one or multiple nodes. The location server 30 may be located inside a radio access network (RAN) made up of base stations (e.g., eNBs and/or gNBs), or the location server 30 may be part or wholly outside of the RAN. The location server 30 may also be part of or located in a base station, in some cases. In the non-limiting embodiments described below, the location server 30 will be described as being configured to provide positioning reference signal configuration information to wireless devices, which may assist the wireless devices in their operation within a cellular network access node in an LTE network or NR network.

Those skilled in the art will readily appreciate how the location server 30, or of multiple nodes that provide the functionality of the location server 30, may be adapted to carry out one or more of the methods and signaling processes described herein, e.g., through the modification of and/or addition of appropriate program instructions for execution by processing circuits 32.

The location server 30 includes communication circuitry for communicating, either directly, or indirectly, with a wireless device 50 that is to receive positioning reference signal configuration information. The communication circuitry, depending on the nature of the communication with the wireless device 50, may include communication interface circuitry 38 for communicating with other nodes in the core network, radio nodes, and/or other types of nodes in the network that could be in communication with the wireless device 50. The location server 30 may also communicate with wireless devices directly using antennas 34 and transceiver circuitry 36. The transceiver circuitry 36 may include transmitter circuits, receiver circuits, and associated control circuits that are collectively configured to transmit and receive signals according to a radio access technology, for the purposes of providing and/or assisting with cellular communication services.

The location server 30 also includes one or more processing circuits 32 that are operatively associated with the transceiver circuitry 36 and, in some cases, the communication interface circuitry 38. The processing circuitry 32 comprises one or more digital processors 42, e.g., one or more microprocessors, microcontrollers, DSPs, FPGAs, CPLDs, ASICs, or any mix thereof. More generally, the processing circuitry 32 may comprise fixed circuitry, or programmable circuitry that is specially configured via the execution of program instructions implementing the functionality taught herein or may comprise some mix of fixed and programmed circuitry. The processor 42 may be multi-core, i.e., having two or more processor cores utilized for enhanced performance, reduced power consumption, and more efficient simultaneous processing of multiple tasks.

The processing circuitry 32 also includes a memory 44. The memory 44, in some embodiments, stores one or more computer programs 46 and, optionally, configuration data 48. The memory 44 provides non-transitory storage for the computer program 46 and it may comprise one or more types of computer-readable media, such as disk storage, solid-state memory storage, or any mix thereof. By way of non-limiting example, the memory 44 comprises any one or more of SRAM, DRAM, EEPROM, and FLASH memory, which may be in the processing circuitry 32 and/or separate from the processing circuitry 32. The memory 44 may also store any configuration data 48 used by the network access node 30. The processing circuitry 32 may be configured, e.g., through the use of appropriate program code stored in memory 44, to carry out one or more of the methods and/or signaling processes detailed hereinafter.

The processing circuitry 32 of the location server 30 is configured, according to some embodiments, to provide positioning reference signal configuration information to a wireless device. The processing circuitry 32 is configured to receive, from the wireless device, a request for assistance. The request for assistance includes information describing at least one cell monitored by the wireless device or includes information about the wireless device's capability to measure or preference for measuring signals transmitted according to each of one or more RATs or includes both the information describing the at least one monitored cell and the information about the wireless device's capability. The processing circuitry 30 is also configured to send to the wireless device, in response to the request for assistance, positioning reference signal configuration information. The positioning reference signal configuration information identifies one or more signals for measurement by the wireless device. Examples of what may be included in the positioning reference signal configuration information were provided above in the discussion of the wireless device.

The processing circuitry 32 of the location server 30 may also be configured to perform a corresponding method 800, such as shown in FIG. 8. The method 800 includes receiving, from the wireless device, a request for assistance (block 802). The request for assistance including information as described above. The method 800 also includes sending to the wireless device, in response to the request for assistance, positioning reference signal configuration information (block 804). The positioning reference signal configuration information identifies one or more signals for measurement by the wireless device.

The method 800 may further include receiving, from the wireless device, a report of one or more measurements of the identified one or more signals. The method 800 may then include estimating a location for the wireless device, based on the report.

In some cases, the method 800 includes sending, prior to receiving the request for assistance, a request for positioning capability information for the wireless device, and receiving, in response to the request for positioning capability information, positioning capability information for the wireless device. The method 800 may also include selecting the one or more signals for measurement by the wireless device based on the indicated capability to measure or preference for measuring signals according to each of one or more RATs.

The request for assistance may include information identifying a cell operating according to a second RAT, differing from a first RAT according to which the wireless device is being served, and the method 800 may then include selecting the one or more signals for measurement by the wireless device based on the identified cell. The request for assistance may also include information describing a primary cell serving the wireless device according to a first RAT, and the method 800 may then include selecting the one or more signals for measurement by the wireless device based on the information describing the primary cell.

Figure 9:
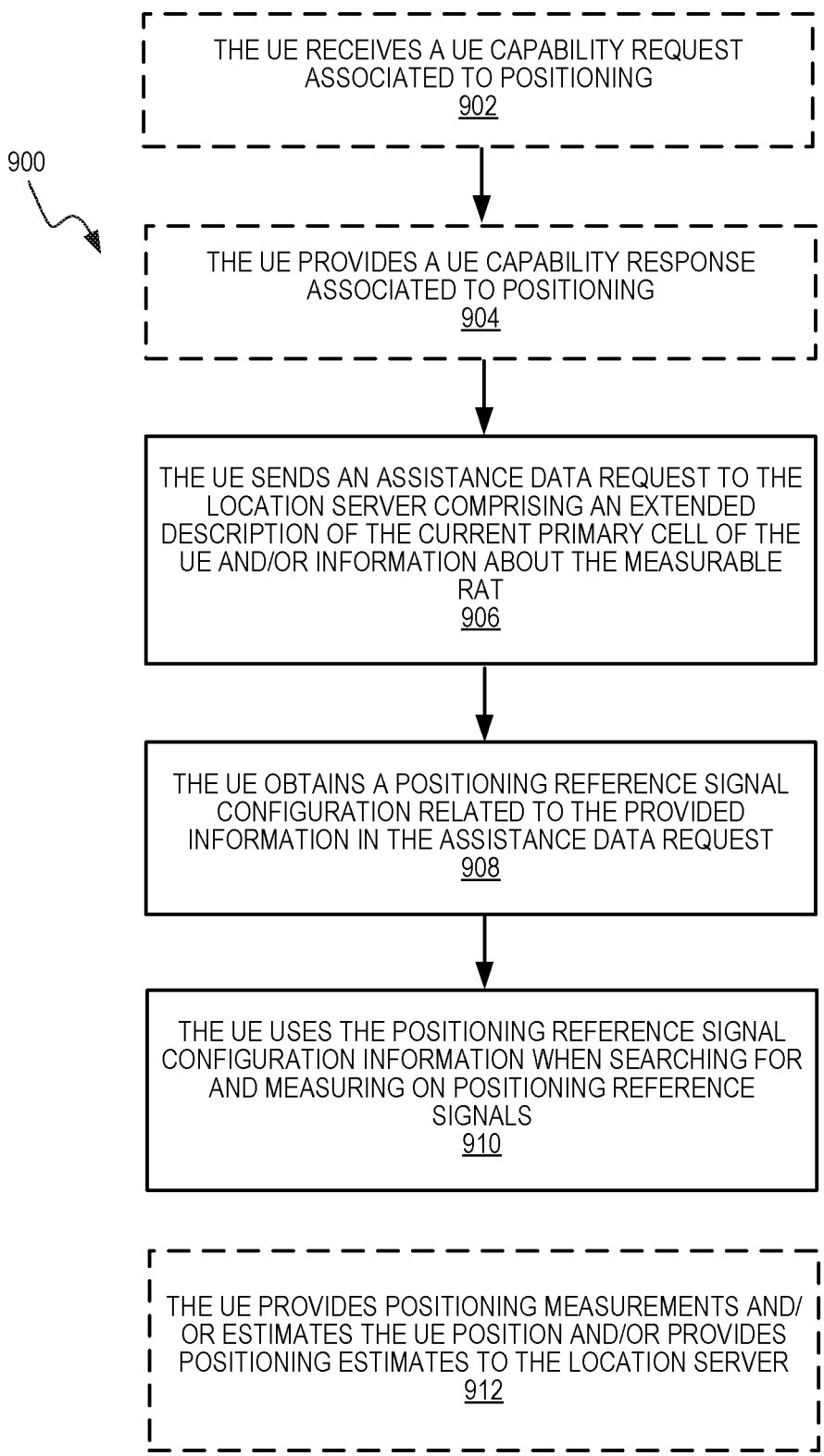
FIG. 9 illustrates a flow diagram of another method, according to some embodiments.

FIG. 9 illustrates an example overall flow diagram of method 900 of these techniques, according to some embodiments. Optionally, a target wireless device (e.g., wireless device 50) is requested by a location server (e.g., location server 30) to provide UE capabilities associated to positioning (block 902), and optionally, the target device provides to the location server such UE capabilities (block 904). The set of UE capabilities may include what RATs the target device is capable or prefers to measure on.

The wireless device requests assistance data from the location server (block 906). The request comprises an extended description of the served cell(s) at the serving base station(s) and/or information about what RATs the target device can handle. In return, the target device obtains positioning reference signal configuration information concerning signals from base stations at a different or same RAT (block 908). The target device uses the configuration information when searching for and measuring on positioning reference signals (block 910). Optionally, the target device provides positioning measurements and/or estimates the position and provides positioning estimates to the location server (block 912).

Figure 10:
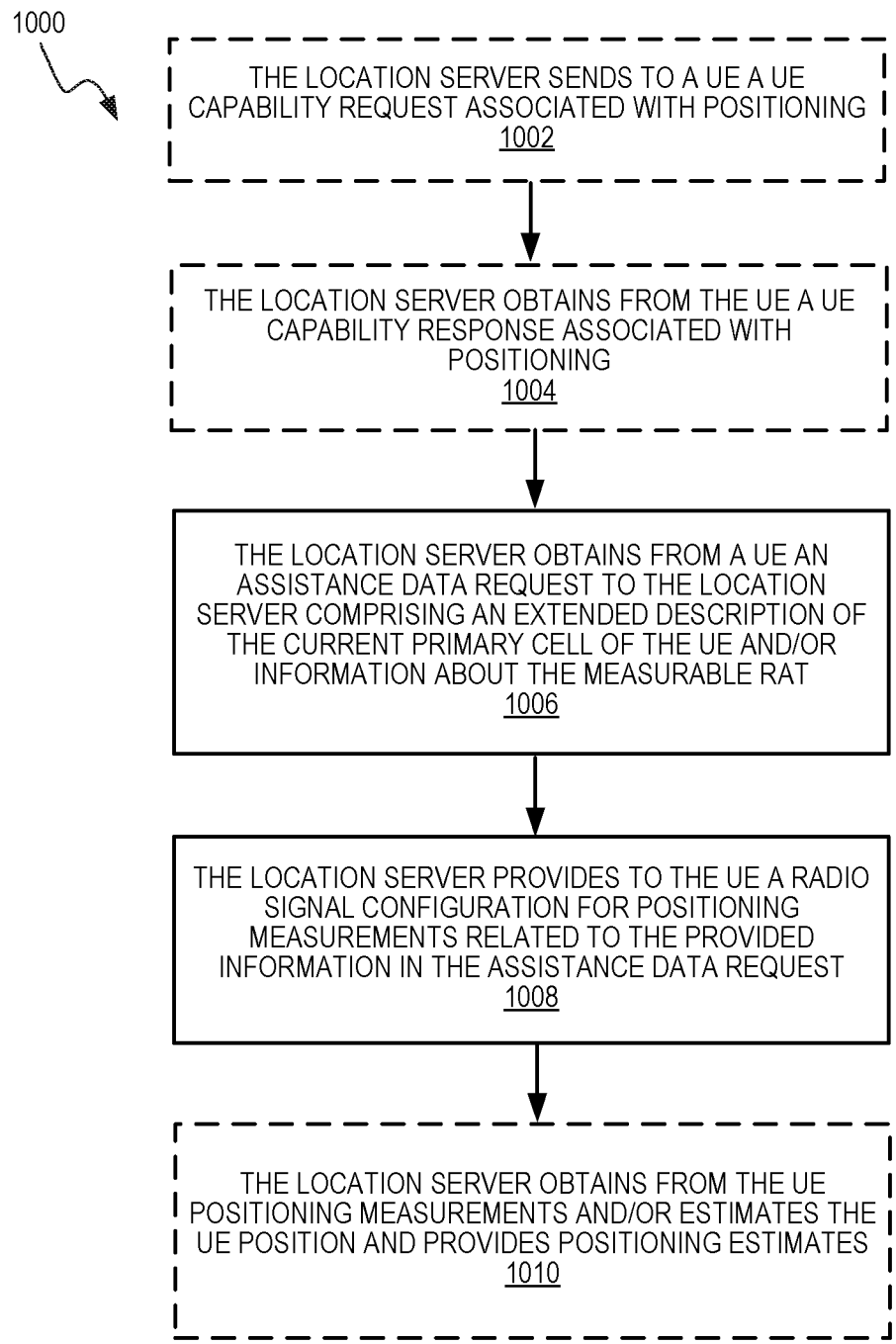
FIG. 10 illustrates a flow diagram of another method, according to some embodiments.

FIG. 10 illustrates a method 1000 for such techniques from the perspective of the location server, according to some embodiments. Optionally, the location server requests the target device to provide UE capabilities associated with positioning (block 1002), and optionally, the location server obtains, from the target device, such UE capabilities (block 1004). The set of UE capabilities may include what RATs the UE is capable to measure on.

The location server then obtains, from the target device, an assistance data request (block 1006). The request comprises an extended description of the served primary cell and/or information about what RATs the target device can handle. The request comprises an extended description of the served primary cell at the serving base station and/or information about what RATs the target device can handle. In return, the location server provides radio signal configuration for positioning measurements for signals from base stations at a different RAT or the same RAT (block 1008). Optionally, the location server obtains positioning measurements and/or position estimates from the target device (block 1010). The UE may perform measurements and report them to the network node. The UE may use them for determining its location or provide them and/or its location to location applications or location-based applications in the UE.

UE Capability Handling

According to the embodiments herein, a UE may provide its capabilities, while a location server (e.g., network node, base station, positioning node or positioning server) may receive the UE capabilities. In addition, the location server may also request such capabilities from the UE and the UE may receive such a request. Furthermore, upon receiving the UE capabilities, the location server may use this capability information to: create and provide assistance data for the UE to enable the UE to perform positioning measurements; configure one or more signals to be used by the UE for positioning measurements according its capability; select the RAT(s) for the positioning measurements for the UE; select the RAT(s) for providing positioning assistance data to the UE (e.g., the assistance data could be provided via LTE PCell and/or NR PSCell, where different measurements or measurement types may be requested via different RATs); select the RAT(s) for reporting by the UE its one or more results of the positioning measurements; and/or determine a first set and/or a number of cells belonging to a first RAT and a second set and/or a number of cells belonging to a second RAT for positioning measurements.

In 904 in FIG. 9, the UE provides its capability related to its ability to operate in a multi-RAT network deployment. In one example, a UE capability related to RAT may be static, i.e., the UE is always capable of this. In another example, a UE capability may be based and depend on the current UE serving cell(s) configuration, e.g., the provided capability may be different when the UE is configured with one serving cell, when the UE is configured with two or more serving cells or carrier aggregation, when the UE is configured with dual connectivity or multi-connectivity (e.g., PCell and one or more PSCells). In yet another example, the provided capability depends on which RAT the PCell belongs to. In yet another example, the provided capability depends from which RAT the request for the capability is received or on whether the request is received from PSCell or PCell (which may be of the same RAT or different RATs).

The capability may include: an indication of one or more RATs the UE is capable of or prefers performing measurements for positioning purpose, always or with a current UE configuration; an indication of RAT(s) in which the UE is capable of or prefers to receive the positioning assistance data enabling the UE to perform positioning measurements (e.g., OTDOA assistance data or E-CID assistance data); an indication of RAT(s) in which the UE is capable of or prefers to report one or more results of the positioning measurements; an indication of RAT(s) in which the UE may have or has PCell and/or PSCell configured (e.g., LTE can be a PCell but not NR or LTE is a PCell and NR is PSCell or NR is PCell, etc.); an indication of whether the UE is capable of and/or prefers performing positioning measurements in multiple RATs in parallel; a maximum number of cells and/or frequencies for positioning measurements in each of the one or more of supported RATs; an indication of the set or a range of the carrier frequencies for positioning measurements in each of the one or more of supported RATs; an indication of the supported bandwidth(s) in each of the one or more of supported RATs; and/or a UE numerology capability (e.g., CP length, subcarrier spacing, mini-slot length, symbol length, an indication of support of multiple numerologies in parallel over some period or in the same time instances such as symbols or subframes, etc.) that may further be associated with a specific carrier frequency(-ies) and/or RAT.

Extended Assistance Data Request

In legacy processes, the target device provides information to the location server about the serving cell(s) (e.g., LTE PCell and/or NR PCell and/or NR PSCell) using the physical cell identifier of that cell. In addition, the device can provide information about the type of assistance data, LTE positioning reference signal or narrow band internet of things (NB-IoT) positioning reference signal. The LPP request is:

```
-- ASN1START (current LTE)
OTDOA-RequestAssistanceData ::= SEQUENCE {
  physCellId    INTEGER (0..503),
  ...,
  [[
    adType-r14  BIT STRING { prs (0), nprs (1) } (SIZE (1..8))
    OPTIONAL
  ]]
}
-- ASN1STOP
```

In one embodiment, the target device may request assistance data for a specific RAT such as E-UTRAN or NR. In one example mode, the signaling can be as in the example below, with a portion highlighted in bold:

```
-- ASN1START (current LTE)
OTDOA-RequestAssistanceData ::= SEQUENCE {
  physCellId    INTEGER (0..503),
  ...,
  [[
    adType-r14  BIT STRING { prs (0), nprs (1) } (SIZE (1..8))
    OPTIONAL
  ]]
  [[
    ratType-r14    BIT STRING { e-utran (0), nr (1) } (SIZE (1..8))
    OPTIONAL
  ]]
}
-- ASN1STOP
```

The details of block 908 are further described in this section, with two main alternatives, detecting an LTE cell and using it as a reference, or using the serving cell as a reference.

Detected LTE Cell as Reference

Figure 11:
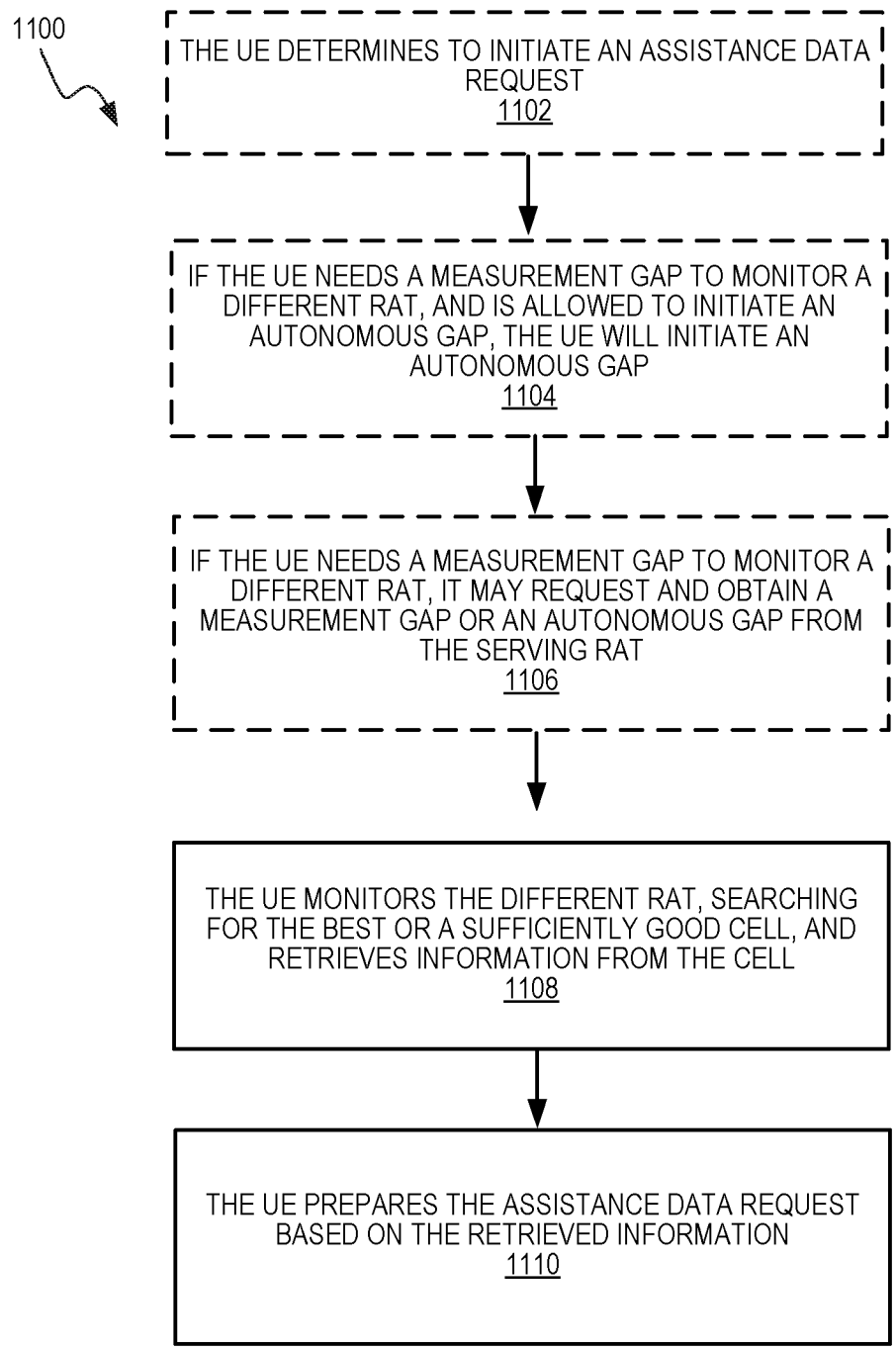
FIG. 11 illustrates a flow diagram of another method, according to some embodiments.

In one embodiment, the target device has to detect and identify the strongest LTE cell before transmitting the OTDOA assistance data request. The flow chart of FIG. 11 describes a method 1100 of the detailed steps of this embodiment. The UE determines to initiate the assistance data request (block 1102). If the UE needs a measurement gap to monitor a different RAT and is allowed to initiate an autonomous gap, the UE will initiate the autonomous gap (block 1104). An autonomous gap is a gap determined by the UE, where the UE neglects uplink transmissions and downlink transmissions during the gap. In one mode, the UE requests permission to use autonomous gaps by the serving base station. In another mode, the UE is pre-configured to use autonomous gaps.

Alternatively, the UE may request a measurement gap from the serving base station (block 1106). During a measurement gap, the UE does not expect any downlink transmissions nor any uplink grants. Then, the UE searches for the most favorable, or at least an acceptable cell at the different RAT, and retrieves the physical cell ID and/or time synchronization information (e.g., SFN) (block 1108). With this information, the UE prepares the assistance data request (block 1110).

Serving Cell as Reference

Alternatively, the target device uses information from the serving RAT. In the case where the target device can be served by one out of several RATs, the target device also needs to provide more information about the RAT. In one embodiment, the target device also provides the RAT of the serving cell. The signaling to support this may be based on an information element indicating the RAT of the serving cell.

In one mode of the embodiment, if the RAT type is omitted, the location server can assume a default RAT, e.g., that the RAT type is LTE/E-UTRAN or NR.

In another mode of the embodiment, the OTDOA assistance data request in LPP is modified according to:

```
-- ASN1START (current LTE)
OTDOA-RequestAssistanceData ::= SEQUENCE {
  physCellId    INTEGER (0..503),
  ...,
  [[
    adType-r14  BIT STRING { prs (0), nprs (1) } (SIZE (1..8))
    OPTIONAL
  ]],
  [[
    servingRatType-r15  ENUMERATE { e-utran, nr, ... }
    OPTIONAL
  ]]
}
-- ASN1STOP
```

Moreover, the range of the physical cell identifier may be too narrow. Therefore, in one embodiment, the target device may need to provide information via an extended value range.

For example, the target device may provide optional more significant bits. In that case, with NR physical cell identities in the range 0-1007 and LTE physical cell identities 0-503, it is possible to represent the extended range with only one additional bit:

```
physCellId-ext INTEGER (1)    OPTIONAL
with a text defining the encoded physical cell ID as
physCellID + 504
if the physCellId-ext is provided.
Other encodings are also possible, for example
physCellId-ext INTEGER (504)    OPTIONAL
with a text defining the encoded physical cell ID as
physCellID + physCellId-ext
if the physCellId-ext is provided.
```

This also can be made future proof by opening up for extensions:

```
physCellId-ext ENUMERATE (504,...)    OPTIONAL
with a text defining the encoded physical cell ID as
physCellID + physCellId-ext
if the physCellId-ext is provided.
```

Furthermore, since NR supports implementations based on multiple beams, the target device can, in yet another embodiment, also provide information about such beams. The physical cell identity of NR can be associated to one or more SS (synchronization source) blocks (SSB), each with having an SS Block ID. Moreover, the SS blocks can be assigned a radio resource centered around the carrier frequency, but can also be assigned a frequency resource with an offset. This offset may be SS block specific. The target device can also be served by a specific beamformed reference signal labeled tracking reference signal (TRS), that the target device uses as synchronization reference. Furthermore, different beams associated with this reference signal may be assigned individual reference signals (channel state information reference signals, CSI-RS) associated with the TRS. The NR specific information may include: the frequency of the serving SS block; the associated SSB, or SSB ID; a TRS ID; and/or a CSI-RS-ID.

Since the timing of the cell in one RAT may be different from the timing of the cells at the RAT where the positioning reference signals are transmitted, it can also be relevant in one embodiment to include information about the SFN. For example, the extended assistance data request (or the UE information sent to the location server to enable it to provide the assistance data to the UE based on this UE information) may include a set or a list of configured and/or activated UE serving cell(s) (e.g., any one or more of: PCell, PSCell, SCells, etc.) and/or the indication of the associated RAT(s) of the serving cells.

The serving cells may be described by, for example, an identification such as PCI (which may or may not have the same PCI range for all supported or indicated RATs), CGI (cell global identity), etc. One or more cells may further be associated with a carrier frequency, bandwidth, or any of the information type listed below.

The extended assistance data request may also include: one or more configuration parameters of the radio signals transmitted in one or more RATs supported by the UE for positioning measurements (e.g., SS block configuration, PRS configuration, CSI-RS configuration, etc.), where the set of RATs may or may not comprise the RAT of the PCell; carrier frequencies, ARFCN, or frequency range(s) of the one or more RATs supported by the UE for positioning measurements, where the set of RATs may or may not comprise the RAT of the PCell; bandwidth (channel bandwidth, UE measurement bandwidth, UE operation bandwidth, current UE RF bandwidth, specific radio signal(s) transmission bandwidth, etc.) of the one or more RATs supported by the UE for positioning measurements, where the set of RATs may or may not comprise the RAT of the PCell; and/or a numerology configuration (e.g., CP length, subcarrier spacing, slot length, mini slot length, symbol length, etc.) associated with a carrier frequency and/or RAT(s), where the set of RATs may or may not comprise the RAT of the PCell.

The extended assistance data request may also include timing information of a second RAT, where the RT is different from a reference RAT or from the PCell RAT, or the timing information of a second RAT with respect to a first RAT. For example, this may be an offset between an LTE SFN # x and an NR SFN # y, an offset between the two specific radio frames or the radio frame boundaries of the two RATs, an offset between two specific subframes or the subframe boundaries of the two RATs, or an indication of the synchronization level between the two RATs, etc.

The UE may provide the information for each RAT explicitly or implicitly (e.g., by indicating whether it is the same or different compared to a reference RAT or a predefined RAT, e.g., compared to LTE or compared to the RAT of PCell.)

Radio Signal Configuration for Positioning Measurements

The radio signal configuration for positioning measurements may need to be associated to a well-defined timing reference, e.g., to enable the UE to correctly determine when the signals to be used for positioning measurements are transmitted and available for receiving by the UE. The radio signal configuration for positioning measurements may be provided in the assistance data for positioning measurements. Examples of positioning measurements are timing measurements that can be used for determining UE location, e.g., RSTD, TOA, TDOA, OTDOA measurements, Rx-Tx time difference measurements, round trip time, etc. Examples of the radio signals are: positioning reference signals (PRS), one or more signals comprised in NR SS block, synchronization signals, DMRS signals, CSI-RS signals, etc.

In one embodiment, the timing reference is associated with the timing of the serving RAT and serving cell. In one mode for NR, this is the NR system frame number # x, e.g., NR SFN0 or NR SFN # y mod maximum LTE SFN. In another example, the timing reference is determined as a function of the NR SFN and LTE SFN.

In another embodiment, the timing reference is associated with LTE. This means that the UE needs to retrieve the system frame number from the LTE system information from the serving LTE cell and/or from (typically) the strongest LTE cell.

Assistance Data Configuration

Herein, a UE is receiving, "understanding" and using the assistance data from the location server or network node, while the location server is creating and sending the assistance data to the UE to enable the positioning measurements in the UE. The UE may use the assistance data to configure its receiver to receive the radio signals for positioning measurements, for performing positioning measurements, for reporting to the location server one or more results of the positioning measurements, for determining its location, etc.

The assistance data is based at least on the information provided by the UE in the extended assistance data request and may also be based on the UE capabilities. For example, the reference cell for TDOA measurements may be selected based on the information provided by the UE. The set or list of cells to be measured may be determined based on the information provided by the UE. The set of RATs in which the UE is requested to perform positioning measurements may be determined based on the information provided by the UE. An offset in time (e.g., between two time instances of a reference cell and a measured cell) may be determined based on the information provided by the UE and may further depend on the SFN range of the RATs which the offset is concerned. The bandwidth to be used for positioning measurements may be determined based on the information provided by the UE. The requested measurements may be in one or more of the numerologies supported or preferred by the UE. The reference and all the measured cells may be selected to be based on the same one numerology, which is supported by the UE. Multiple reference cells for OTDOA measurements may be provided to the UE, e.g., one reference cell per RAT when the UE is configured with at least one serving cell in a first RAT (e.g., PCell) and at least a second serving cell (e.g., PSCell or SCell) in a second RAT. In addition to the reference cell (e.g., for RSTD or OTDOA measurements or a like), the assistance data may also comprise a reference RAT.

The UE may be configured to determine how to retrieve the relevant information in order to request assistance data. In one mode, the processing circuitry of the UE is configured to instruct the UE's radio circuitry to relocate to E-UTRAN and detect and decode an E-UTRAN cell information to retrieve a cell identifier. In another mode, the processing circuitry is configured to instruct the radio circuitry to retrieve information from the serving NR cell information. The processing circuitry can also be configured to determine the need for measurement gaps, and if deemed necessary, either instruct its radio circuitry to request measurement gaps from the serving base station.

The processing circuitry of the UE may be further configured to determine the timing of positioning reference signals and/or other signals based on timing information retrieved via the radio circuitry together with information provided by the location server. The memory of the UE may be configured to store information associated with the serving NR base station and cell, as well as information about cells and/or signals at a different RAT. The radio circuitry of the UE may be configured to communicate with served UEs, including configuring measurement reporting from such UEs. The radio circuitry can be configured to reconfigure the measurement reporting of UEs to the location server.

Figure 12:
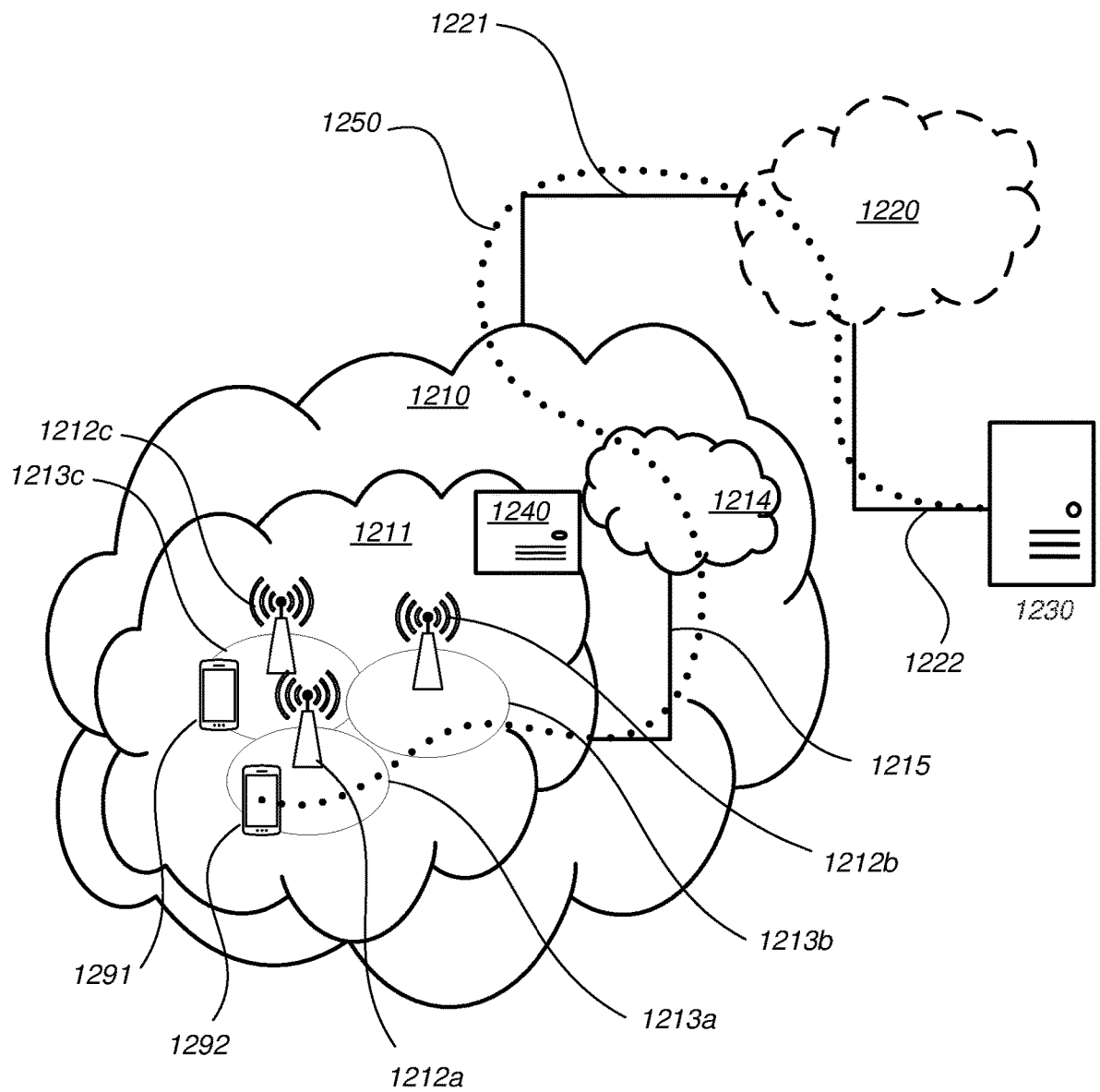
FIG. 12 schematically illustrates a telecommunication network connected via an intermediate network to a host computer, according to some embodiments.

FIG. 12, according to some embodiments, illustrates a communication system that includes a telecommunication network 1210, such as a 3GPP-type cellular network, which comprises an access network 1211, such as a radio access network, and a core network 1214. The access network 1211 comprises a plurality of base stations 1212a, 1212b, 1212c, such as NBs, eNBs, gNBs or other types of wireless access points, each defining a corresponding coverage area 1213a, 1213b, 1213c. Each base station 1212a, 1212b, 1212c is connectable to the core network 1214 over a wired or wireless connection 1215. A first user equipment (UE) 1291 located in coverage area 1213c is configured to wirelessly connect to, or be paged by, the corresponding base station 1212c. A second UE 1292 in coverage area 1213a is wirelessly connectable to the corresponding base station 1212a. While a plurality of UEs 1291, 1292 are illustrated in this example, the disclosed embodiments are equally applicable to a situation where a sole UE is in the coverage area or where a sole UE is connecting to the corresponding base station 1212.

A location server 1240 may exist to provide positioning reference signal configuration information to the UE. The location server 1240 may be made up of one or more nodes that may be in and/or out of access network 1211. In some cases, the location server 1240 is located in telecommunication network 1210. In other cases, the location server 1240 is located outside of the telecommunication network 1210.

The telecommunication network 1210 is itself connected to a host computer 1230, which may be embodied in the hardware and/or software of a standalone server, a cloud-implemented server, a distributed server or as processing resources in a server farm. The host computer 1230 may be under the ownership or control of a service provider or may be operated by the service provider or on behalf of the service provider. The connections 1221, 1222 between the telecommunication network 1210 and the host computer 1230 may extend directly from the core network 1214 to the host computer 1230 or may go via an optional intermediate network 1220. The intermediate network 1220 may be one of, or a combination of more than one of, a public, private or hosted network; the intermediate network 1220, if any, may be a backbone network or the Internet; in particular, the intermediate network 1220 may comprise two or more sub-networks (not shown).

The communication system of FIG. 12 as a whole enables connectivity between one of the connected UEs 1291, 1292 and the host computer 1230. The connectivity may be described as an over-the-top (OTT) connection 1250. The host computer 1230 and the connected UEs 1291, 1292 are configured to communicate data and/or signaling via the OTT connection 1250, using the access network 1211, the core network 1214, any intermediate network 1220 and possible further infrastructure (not shown) as intermediaries. The OTT connection 1250 may be transparent in the sense that the participating communication devices through which the OTT connection 1250 passes are unaware of routing of uplink and downlink communications. For example, a base station 1212 may not or need not be informed about the past routing of an incoming downlink communication with data originating from a host computer 1230 to be forwarded (e.g., handed over) to a connected UE 1291. Similarly, the base station 1212 need not be aware of the future routing of an outgoing uplink communication originating from the UE 1291 towards the host computer 1230.

Example implementations, in accordance with an embodiment, of the UE, base station and host computer discussed in the preceding paragraphs will now be described with reference to FIG. 13. In a communication system 1300, a host computer 1310 comprises hardware 1315 including a communication interface 1316 configured to set up and maintain a wired or wireless connection with an interface of a different communication device of the communication system 1300. The host computer 1310 further comprises processing circuitry 1318, which may have storage and/or processing capabilities. In particular, the processing circuitry 1318 may comprise one or more programmable processors, application-specific integrated circuits, field programmable gate arrays or combinations of these (not shown) adapted to execute instructions. The host computer 1310 further comprises software 1311, which is stored in or accessible by the host computer 1310 and executable by the processing circuitry 1318. The software 1311 includes a host application 1312. The host application 1312 may be operable to provide a service to a remote user, such as a UE 1330 connecting via an OTT connection 1350 terminating at the UE 1330 and the host computer 1310. In providing the service to the remote user, the host application 1312 may provide user data which is transmitted using the OTT connection 1350.

The communication system 1300 further includes a base station 1320 provided in a telecommunication system and comprising hardware 1325 enabling it to communicate with the host computer 1310 and with the UE 1330. The hardware 1325 may include a communication interface 1326 for setting up and maintaining a wired or wireless connection with an interface of a different communication device of the communication system 1300, as well as a radio interface 1327 for setting up and maintaining at least a wireless connection 1370 with a UE 1330 located in a coverage area (not shown in FIG. 13) served by the base station 1320. The communication interface 1326 may be configured to facilitate a connection 1360 to the host computer 1310. The connection 1360 may be direct or it may pass through a core network (not shown in FIG. 13) of the telecommunication system and/or through one or more intermediate networks outside the telecommunication system. In the embodiment shown, the hardware 1325 of the base station 1320 further includes processing circuitry 1328, which may comprise one or more programmable processors, application-specific integrated circuits, field programmable gate arrays or combinations of these (not shown) adapted to execute instructions. The base station 1320 further has software 1321 stored internally or accessible via an external connection.

The communication system 1300 may further include a location server 1380 provided in or out of a telecommunication system and comprising hardware 1385 enabling it to communicate with the UE 1330. The hardware 1385 may include a communication interface 1386 for indirectly communicating with the UE 1330, perhaps through base station 1320, to provide it positioning reference signal configuration information, and/or a radio interface 1387 for setting up and maintaining a wireless connection with the UE 1330. In the embodiment shown, the hardware 1385 of the location server 1380 further includes processing circuitry 1388, which may comprise one or more programmable processors, application-specific integrated circuits, field programmable gate arrays or combinations of these (not shown) adapted to execute instructions. The location server 1380 further has software 1381 stored internally or accessible via an external connection.

The communication system 1300 further includes the UE 1330 already referred to. Its hardware 1335 may include a radio interface 1337 configured to set up and maintain a wireless connection 1370 with a base station serving a coverage area in which the UE 1330 is currently located and possibly location server 1380. The hardware 1335 of the UE 1330 further includes processing circuitry 1338, which may comprise one or more programmable processors, application-specific integrated circuits, field programmable gate arrays or combinations of these (not shown) adapted to execute instructions. The UE 1330 further comprises software 1331, which is stored in or accessible by the UE 1330 and executable by the processing circuitry 1338. The software 1331 includes a client application 1332. The client application 1332 may be operable to provide a service to a human or non-human user via the UE 1330, with the support of the host computer 1310. In the host computer 1310, an executing host application 1312 may communicate with the executing client application 1332 via the OTT connection 1350 terminating at the UE 1330 and the host computer 1310. In providing the service to the user, the client application 1332 may receive request data from the host application 1312 and provide user data in response to the request data. The OTT connection 1350 may transfer both the request data and the user data. The client application 1332 may interact with the user to generate the user data that it provides.

Figure 13:
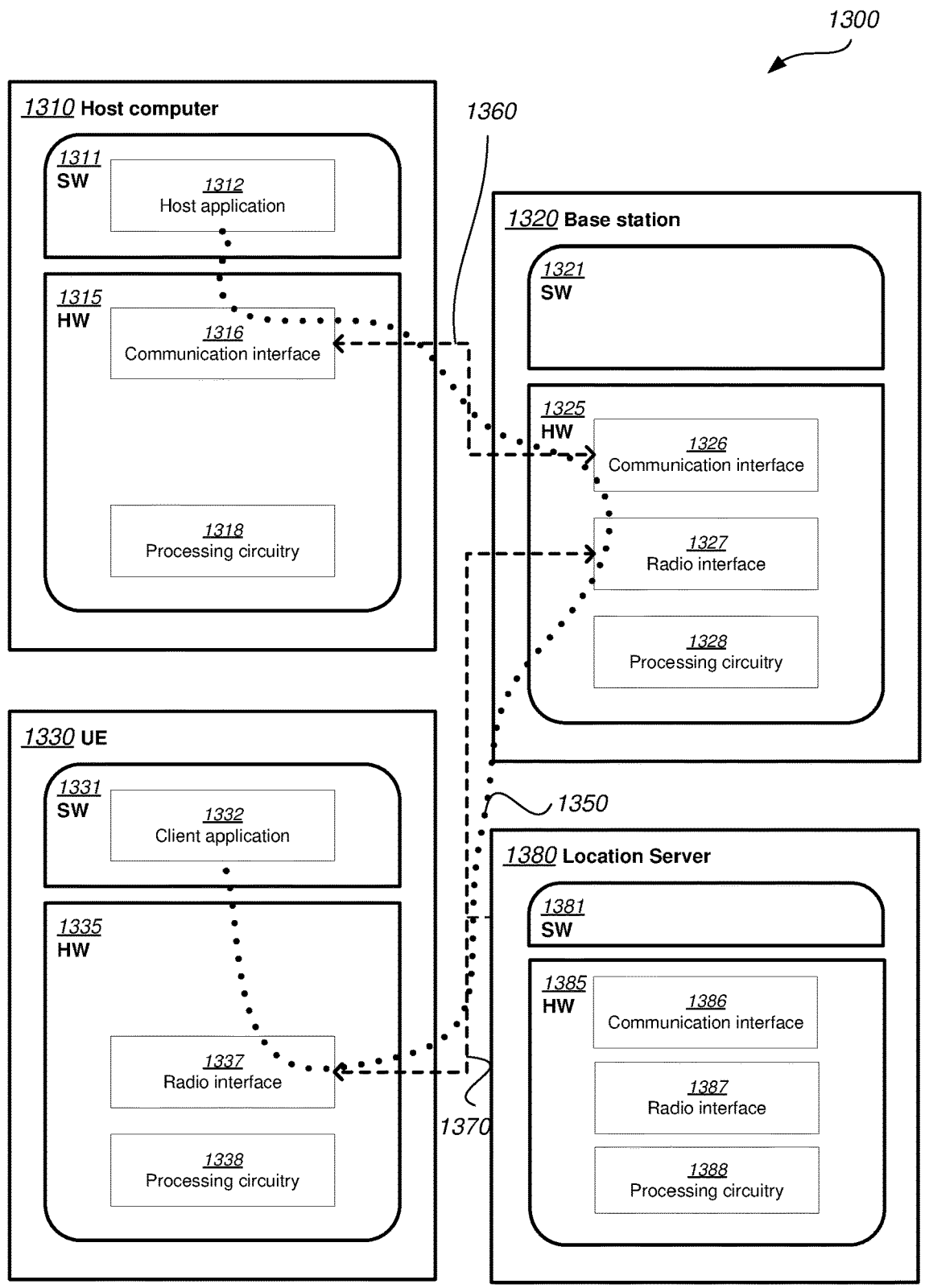
FIG. 13 is a generalized block diagram of a host computer communicating via a base station with a user equipment over a partially wireless connection, the user equipment assisted by a location server, according to some embodiments.

It is noted that the host computer 1310, base station 1320, UE 1330, location server 1340 illustrated in FIG. 13 may be identical to the host computer 1230, one of the base stations 1212a, 1212b, 1212c, one of the UEs 1291, 1292 and location server 1240 of FIG. 12, respectively. This is to say, the inner workings of these entities may be as shown in FIG. 13 and independently, the surrounding network topology may be that of FIG. 12.

In FIG. 13, the OTT connection 1350 has been drawn abstractly to illustrate the communication between the host computer 1310 and the use equipment 1330 via the base station 1320, without explicit reference to any intermediary devices and the precise routing of messages via these devices. Network infrastructure may determine the routing, which it may be configured to hide from the UE 1330 or from the service provider operating the host computer 1310, or both. While the OTT connection 1350 is active, the network infrastructure may further take decisions by which it dynamically changes the routing (e.g., on the basis of load balancing consideration or reconfiguration of the network).

The wireless connection 1370 between the UE 1330 and the base station 1320 and the assistance provided by the location server 1380 is in accordance with the teachings of the embodiments described throughout this disclosure, such as provided for wireless device 50 and location server 30, along with the corresponding methods 600 and 800-1100 involving the location server 1380. The various embodiments described herein allow for the UE 1330 to receive positioning reference signal configuration information from the location server 1380. This means that the UE 1330 will have more accurate positioning information. Accordingly, the teachings of these embodiments may improve the data rate, capacity, quality, latency and/or power consumption for the network and UE 1330 using the OTT connection 1350 and thereby provide benefits such as reduced user waiting time, more capacity, better service, better responsiveness, and better device battery time.

A measurement procedure may be provided for the purpose of monitoring data rate, latency and other factors on which the one or more embodiments improve. There may further be an optional network functionality for reconfiguring the OTT connection 1350 between the host computer 1310 and UE 1330, in response to variations in the measurement results. The measurement procedure and/or the network functionality for reconfiguring the OTT connection 1350 may be implemented in the software 1311 of the host computer 1310 or in the software 1331 of the UE 1330, or both. In embodiments, sensors (not shown) may be deployed in or in association with communication devices through which the OTT connection 1350 passes; the sensors may participate in the measurement procedure by supplying values of the monitored quantities exemplified above, or supplying values of other physical quantities from which software 1311, 1331 may compute or estimate the monitored quantities. The reconfiguring of the OTT connection 1350 may include message format, retransmission settings, preferred routing etc.; the reconfiguring need not affect the base station 1320, and it may be unknown or imperceptible to the base station 1320. Such procedures and functionalities may be known and practiced in the art. In certain embodiments, measurements may involve proprietary UE signaling facilitating the host computer's 1310 measurements of throughput, propagation times, latency and the like. The measurements may be implemented in that the software 1311, 1331 causes messages to be transmitted, in particular empty or 'dummy' messages, using the OTT connection 1350 while it monitors propagation times, errors etc.

Figure 14:
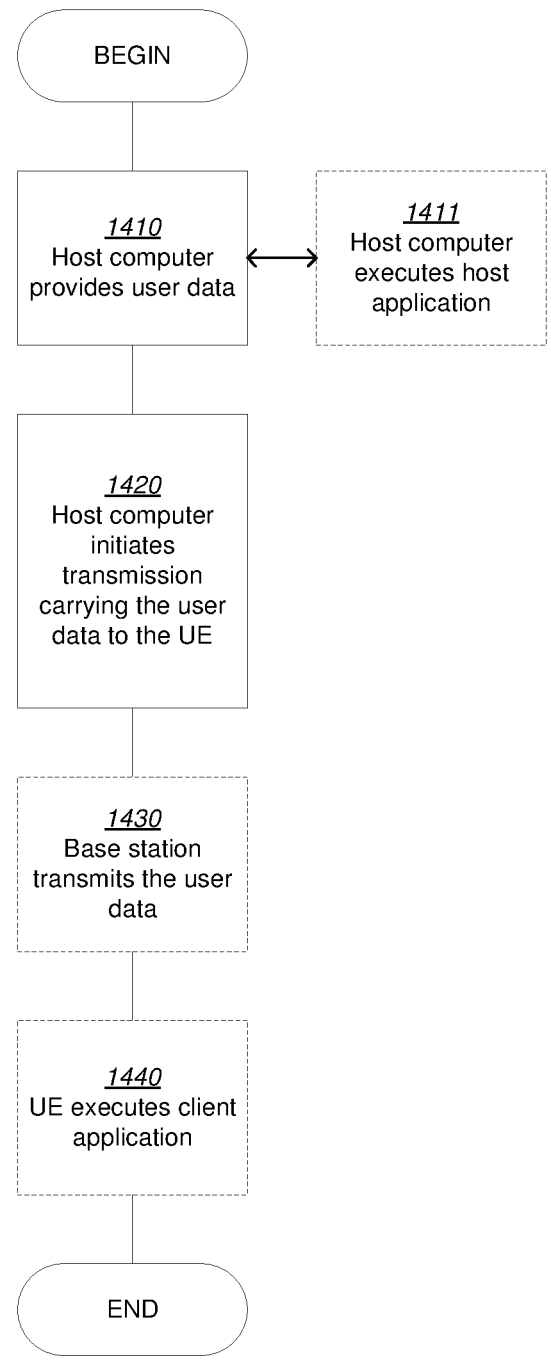
FIGS. 14 to 17 are flowcharts illustrating example methods implemented in a communication system including a host computer, a base station, location server and a user equipment.

FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this section. In a first step 1410 of the method, the host computer provides user data. In an optional substep 1411 of the first step 1410, the host computer provides the user data by executing a host application. In a second step 1420, the host computer initiates a transmission carrying the user data to the UE. In an optional third step 1430, the base station transmits to the UE the user data which was carried in the transmission that the host computer initiated, in accordance with the teachings of the embodiments described throughout this disclosure. In an optional fourth step 1440, the UE executes a client application associated with the host application executed by the host computer.

Figure 15:
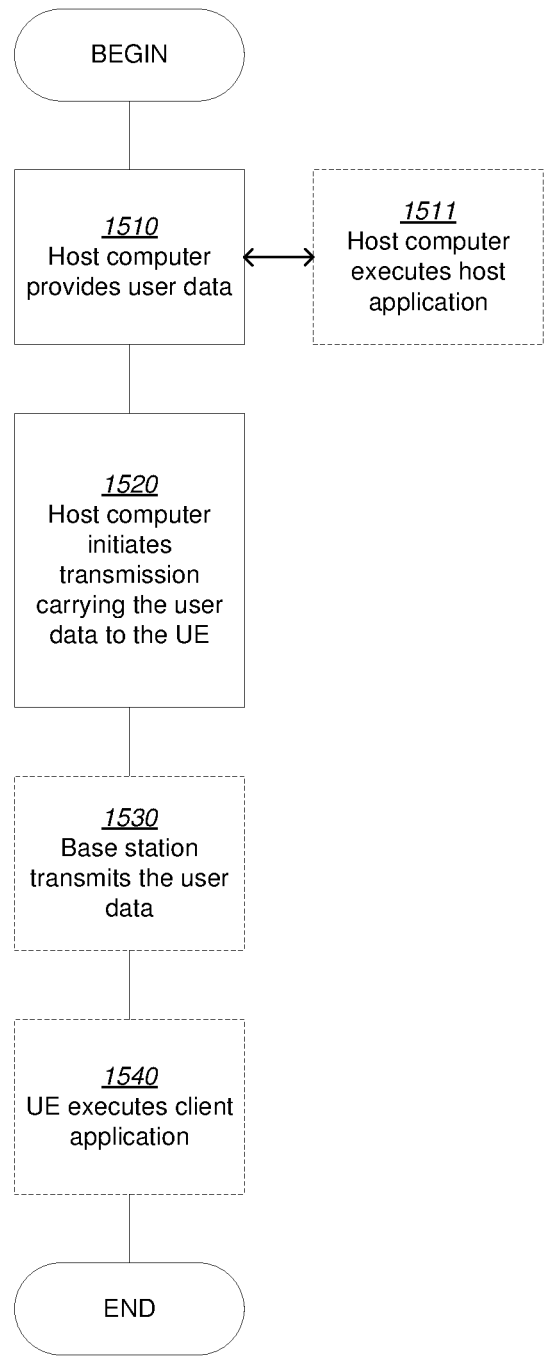

FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this section. In a first step 1510 of the method, the host computer provides user data. In an optional substep (not shown) the host computer provides the user data by executing a host application. In a second step 1520, the host computer initiates a transmission carrying the user data to the UE. The transmission may pass via the base station, in accordance with the teachings of the embodiments described throughout this disclosure. In an optional third step 1530, the UE receives the user data carried in the transmission.

Figure 16:
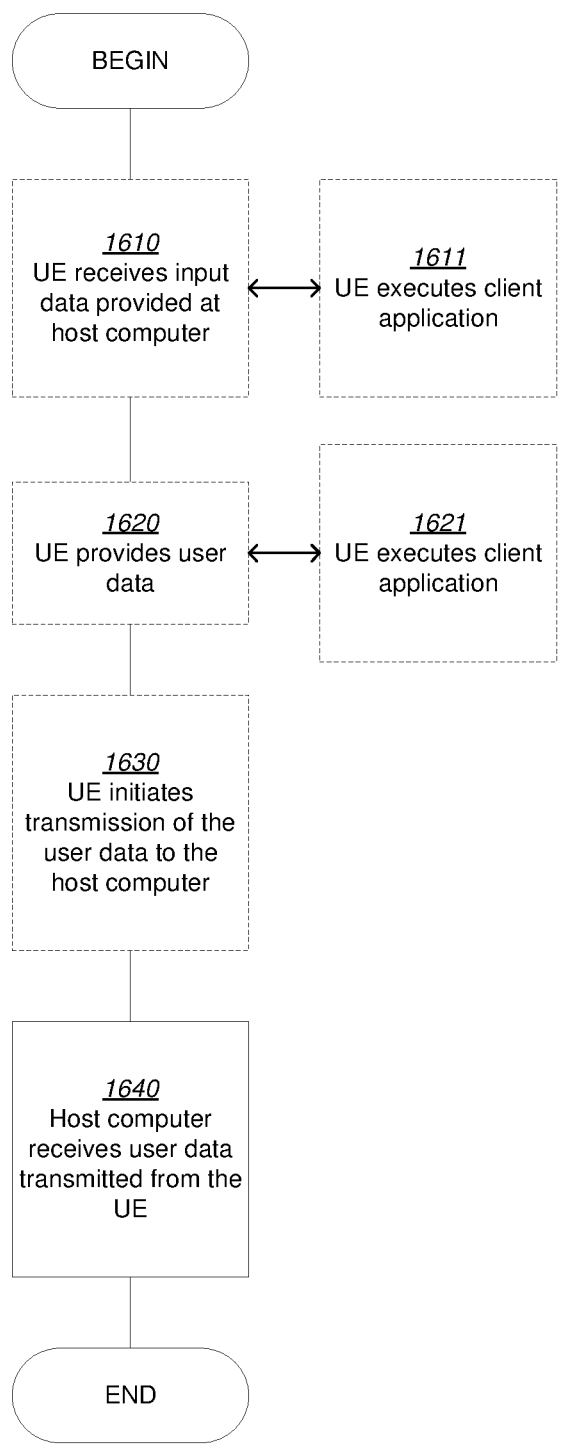

FIG. 16 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 16 will be included in this section. In an optional first step 1610 of the method, the UE receives input data provided by the host computer. Additionally or alternatively, in an optional second step 1620, the UE provides user data. In an optional substep 1621 of the second step 1620, the UE provides the user data by executing a client application. In a further optional substep 1611 of the first step 1610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 1630, transmission of the user data to the host computer. In a fourth step 1640 of the method, the host computer receives the user data transmitted from the UE, in accordance with the teachings of the embodiments described throughout this disclosure.

Figure 17:
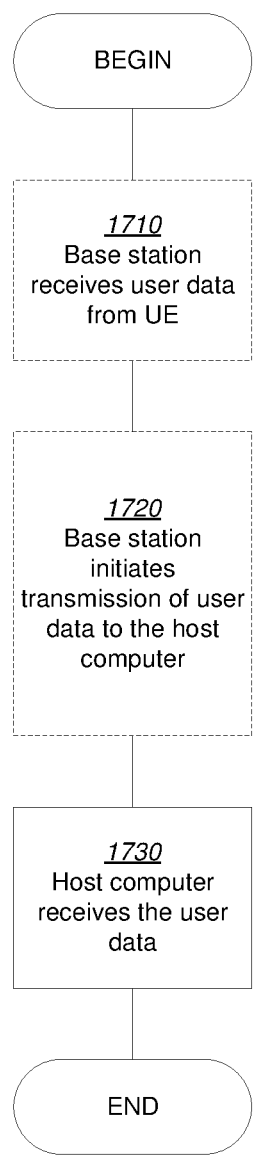

FIG. 17 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 17 will be included in this section. In an optional first step 1710 of the method, in accordance with the teachings of the embodiments described throughout this disclosure, the base station receives user data from the UE. In an optional second step 1720, the base station initiates transmission of the received user data to the host computer. In a third step 1730, the host computer receives the user data carried in the transmission initiated by the base station.

As discussed in detail above, the techniques described herein, e.g., as illustrated in the process flow diagrams of FIGS. 6 and 8-11, may be implemented, in whole or in part, using computer program instructions executed by one or more processors. It will be appreciated that a functional implementation of these techniques may be represented in terms of functional modules, where each functional module corresponds to a functional unit of software executing in an appropriate processor or to a functional digital hardware circuit, or some combination of both.

Figure 18:
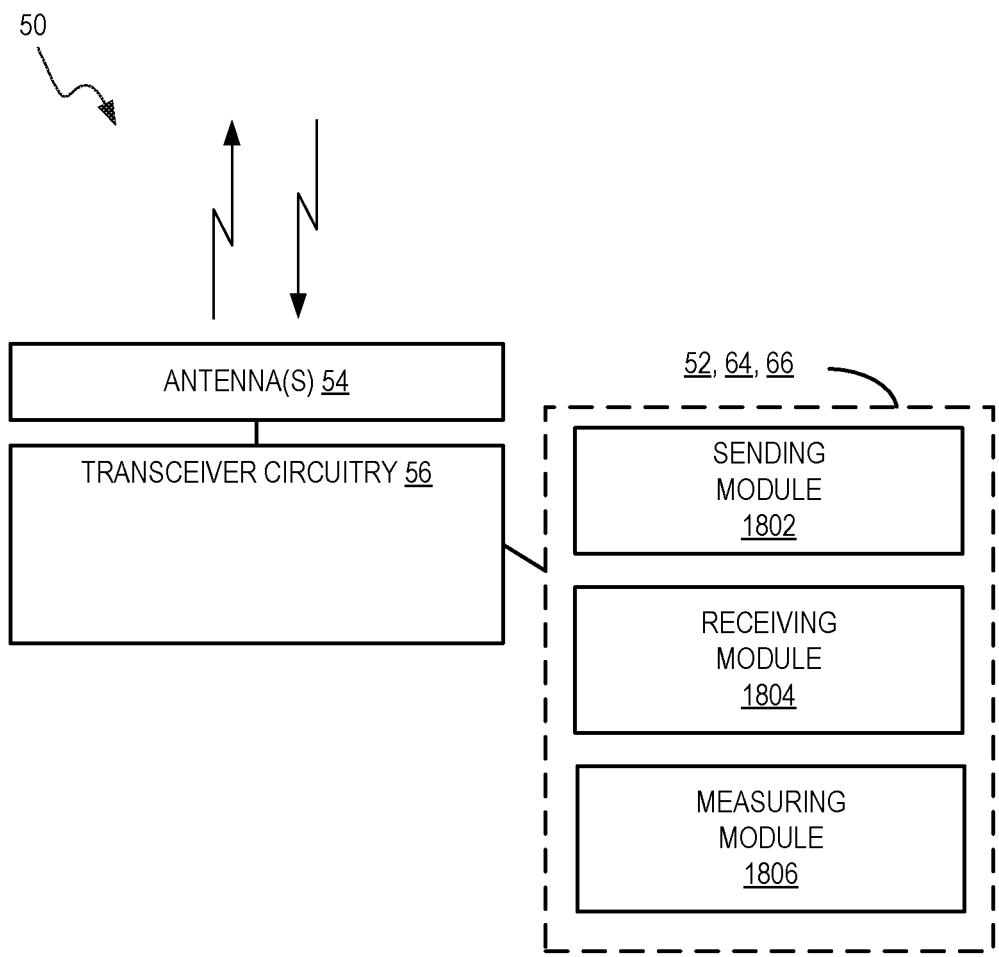
FIG. 18 is a block diagram illustrating a functional implementation of a wireless device, according to some embodiments.

FIG. 18 illustrates an example functional module or circuit architecture as may be implemented in a wireless device, such as in wireless device 50. The functional implementation includes a sending module 1802 for sending, to a location server, a request for assistance. The request for assistance includes information describing at least one cell monitored by the wireless device, or includes information about the wireless device's capability to measure or preference for measuring signals transmitted according to each of one or more RATs, or includes both the information describing the at least one monitored cell and the information about the wireless device's capability. The implementation also includes a receiving module 1804 for receiving, in response to the request for assistance, positioning reference signal configuration information. The positioning reference signal configuration information identifies one or more signals for measurement by the wireless device. The implementation further includes a measuring module 1806 for measuring at least one of the identified one or more signals.

Figure 19:
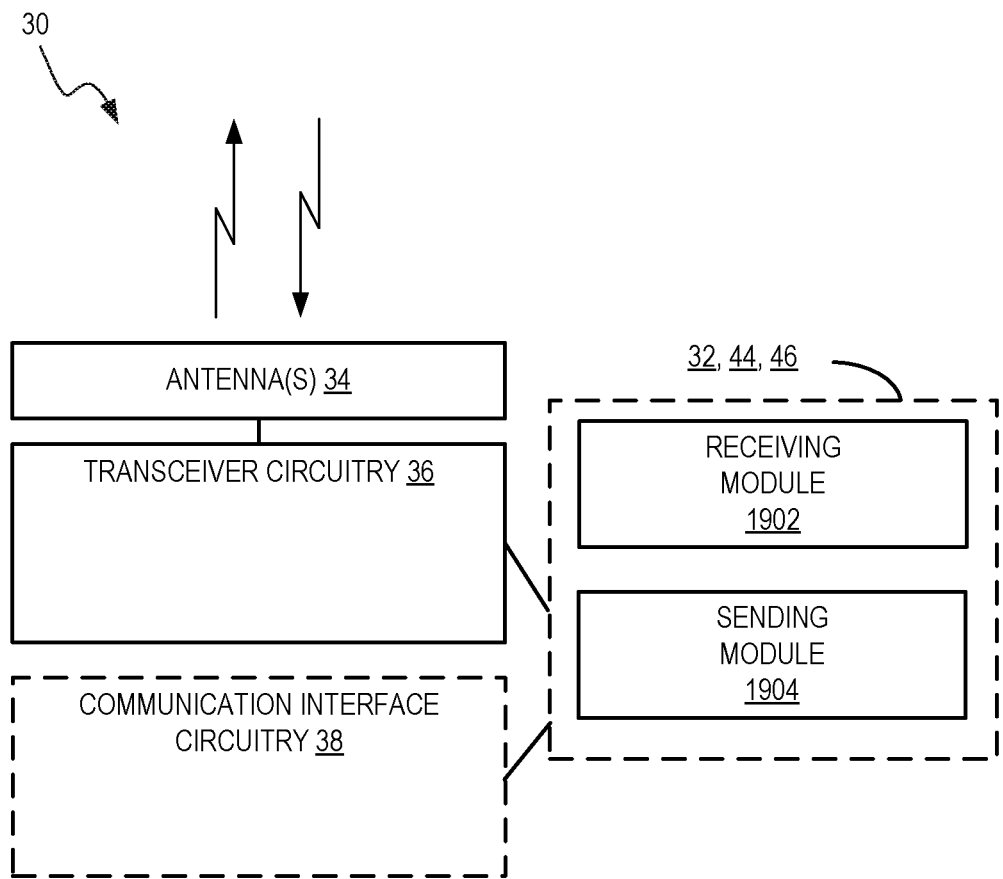
FIG. 19 is a block diagram illustrating a functional implementation of a location server, according to some embodiments.

FIG. 19 illustrates an example functional module or circuit architecture as may be implemented in a location server, such as in location server 30. The functional implementation includes a receiving module 1902 for receiving, from the wireless device, a request for assistance. The request for assistance includes information describing at least one cell monitored by the wireless device, or includes information about the wireless device's capability to measure or preference for measuring signals transmitted according to each of one or more RATs, or includes both said information describing the at least one monitored cell and said information about the wireless device's capability. The implementation also includes a sending module 1904 for sending to the wireless device, in response to the request for assistance, positioning reference signal configuration information. The positioning reference signal configuration information identifies one or more signals for measurement by the wireless device.

EXAMPLE EMBODIMENTS

Example embodiments can include, but are not limited to, the following enumerated examples:

1. A method, in a wireless device, for obtaining positioning reference signal configuration information, the method comprising:
   sending, to a location server, a request for assistance, the request for assistance including information describing at least one cell monitored by the wireless device, or including information about the wireless device's capability to measure or preference for measuring signals transmitted according to each of one or more radio access technologies (RATs), or including both said information describing the at least one monitored cell and said information about the wireless device's capability;
   receiving, in response to the request for assistance, positioning reference signal configuration information, the positioning reference signal configuration information identifying one or more signals for measurement by the wireless device; and measuring at least one of the identified one or more signals.

2. The method of example embodiment 1, further comprising reporting one or more measurements for the measured signal or signals.

3. The method of example embodiment 1, further comprising estimating a location for the wireless device, based on one or more measurements for the measured signal or signals.

4. The method of any of example embodiments 1-3, the method further comprising:
   receiving, prior to said sending, a request for positioning capability information for the wireless device; and
   sending, in response to the request for positioning capability information, positioning capability information for the wireless device.

5. The method of example embodiment 4, wherein positioning capability information indicates the wireless device's capability to measure or preference for measuring signals according to each of one or more RATs.

6. The method of example embodiment 4 or 5, wherein the positioning capability information includes one or more of the following:
   a current wireless device configuration with respect to multi-RAT operation;
   an indication of one or more RATs according to which the wireless device is capable of receiving or prefers to receive positioning assistance data;
   an indication one or more RATs according to which the wireless device is capable of reporting or prefers to report results of positioning measurements;
   an indication of one or more RATs for which the wireless device has a primary cell configured;
   an indication of whether the wireless device is capable of and/or prefers performing positioning measurements of signals according to multiple RATs in parallel;
   an indication of a maximum number of cells and/or frequencies for positioning measurements according to each of one or more of supported RATs;
   an indication of a set or a range of carrier frequencies for positioning measurements according to each of one or more of supported RATs;
   an indication of supported bandwidth(s) according to each of one or more of supported RATs; and
   an indication of the wireless device's numerology capability with respect to each of one or more supported RATs.

7. The method of any of example embodiments 1-6, wherein the wireless device is being served by a primary cell operating according to a first RAT, wherein the method further comprises identifying a strongest cell operating according to a second RAT, differing from the first RAT, and wherein the request for assistance includes information identifying the identified strongest cell operating according to the second RAT.

8. The method of example embodiment 7, wherein the method further comprises establishing a measurement gap for monitoring signals according to the second RAT, prior to identifying the strongest cell.

9. The method of example embodiment 8, wherein establishing the measurement gap comprises requesting a measurement gap, via the primary cell in the first RAT.

10. The method of example embodiment 8, wherein establishing the measurement gap comprises autonomously setting up the measurement gap.

11. The method of any of example embodiments 1-10, wherein the request for assistance includes information describing a primary cell serving the wireless device according to a first RAT.

12. The method of example embodiment 11, wherein the information describing the primary cell serving the wireless device includes one or more of:
   a cell identifier for the primary cell;
   a carrier frequency for the primary cell;
   a frequency of a serving synchronization signal block (serving SSB);
   an identifier of an SSB;
   a tracking reference signal identifier;
   an identifier of a channel-state information reference signal; and
   timing information for the primary cell.

13. The method of any of example embodiments 1-12, wherein the request for assistance includes information describing one or more cells serving the wireless device other than a primary cell serving the wireless device.

14. The method of any of example embodiments 1-13, wherein the positioning reference signal configuration information comprises timing information for one or more of the identified signals for measurement by the wireless device, and wherein said measuring the at least one of the identified one or more signals comprises using the timing information.

15. A method, in a location server, for providing positioning reference signal configuration information to a wireless device, the method comprising:

receiving, from the wireless device, a request for assistance, the request for assistance including information describing at least one cell monitored by the wireless device, or including information about the wireless device's capability to measure or preference for measuring signals transmitted according to each of one or more radio access technologies (RATs), or including both said information describing the at least one monitored cell and said information about the wireless device's capability; and sending to the wireless device, in response to the request for assistance, positioning reference signal configuration information, the positioning reference signal configuration information identifying one or more signals for measurement by the wireless device.

16. The method of example embodiment 15, further comprising receiving, from the wireless device, a report of one or more measurements of the identified one or more signals.

17. The method of example embodiment 16, further comprising estimating a location for the wireless device, based on the report.

18. The method of any of example embodiments 15-17, the method further comprising: sending, prior to receiving the request for assistance, a request for positioning capability information for the wireless device; and receiving, in response to the request for positioning capability information, positioning capability information for the wireless device.

19. The method of example embodiment 18, wherein the positioning capability information indicates the wireless device's capability to measure or preference for measuring signals according to each of one or more RATs, and wherein the method further comprises selecting the one or more signals for measurement by the wireless device based on the indicated capability to measure or preference for measuring signals according to each of one or more RATs.

20. The method of example embodiment 18 or 19, wherein the positioning capability information includes one or more of the following:
 a current wireless device configuration with respect to multi-RAT operation;
 an indication of one or more RATs according to which the wireless device is capable of receiving or prefers to receive positioning assistance data;
 an indication one or more RATs according to which the wireless device is capable of reporting or prefers to report results of positioning measurements;
 an indication of one or more RATs for which the wireless device has a primary cell configured;
 an indication of whether the wireless device is capable of and/or prefers performing positioning measurements of signals according to multiple RATs in parallel;
 an indication of a maximum number of cells and/or frequencies for positioning measurements according to each of one or more of supported RATs;
 an indication of a set or a range of carrier frequencies for positioning measurements according to each of one or more of supported RATs;
 an indication of supported bandwidth(s) according to each of one or more of supported RATs; and
 an indication of the wireless device's numerology capability with respect to each of one or more supported RATs.

21. The method of any of example embodiments 15-20, wherein the request for assistance includes information identifying a cell operating according to a second RAT, differing from a first RAT according to which the wireless device is being served, and wherein the method further comprises selecting the one or more signals for measurement by the wireless device based on the identified cell.

22. The method of any of example embodiments 15-21, wherein the request for assistance includes information describing a primary cell serving the wireless device according to a first RAT, and wherein the method further comprises selecting the one or more signals for measurement by the wireless device based on the information describing the primary cell.

23. The method of example embodiment 22, wherein the information describing the primary cell serving the wireless device includes one or more of:
 a cell identifier for the primary cell;
 a carrier frequency for the primary cell;
 a frequency of a serving synchronization signal block (serving SSB);
 an identifier of an SSB;
 a tracking reference signal identifier;
 an identifier of a channel-state information reference signal; and
 timing information for the primary cell.

24. The method of any of example embodiments 15-23, wherein the request for assistance includes information describing one or more cells serving the wireless device other than a primary cell serving the wireless device.

25. The method of any of example embodiments 15-24, wherein the positioning reference signal configuration information comprises timing information for one or more of the identified signals for measurement by the wireless device.

26. A wireless device configured to obtain positioning reference signal configuration information, the wireless device comprising:
 transceiver circuitry configured for communicating directly or indirectly with a location server and one or more wireless communication networks; and
 processing circuitry operatively associated with the transceiver circuitry and configured to:
  send, to the location server, a request for assistance, the request for assistance including information describing at least one cell monitored by the wireless device, or including information about the wireless device's capability to measure or preference for measuring signals transmitted according to each of one or more radio access technologies (RATs), or including both said information describing the at least one monitored cell and said information about the wireless device's capability;
  receive, in response to the request for assistance, positioning reference signal configuration information, the positioning reference signal configuration information identifying one or more signals for measurement by the wireless device; and
  measuring at least one of the identified one or more signals.

27. The wireless device of example embodiment 26, wherein the processing circuitry is configured to report one or more measurements for the measured signal or signals.

28. The wireless device of example embodiment 26, wherein the processing circuitry is configured to estimate a location for the wireless device, based on one or more measurements for the measured signal or signals.

29. The wireless device of any of example embodiments 26-28, wherein the processing circuitry is configured to:
 receive, prior to said sending, a request for positioning capability information for the wireless device; and send, in response to the request for positioning capability information, positioning capability information for the wireless device.

30. The wireless device of example embodiment 29, wherein the positioning capability information indicates the wireless device's capability to measure or preference for measuring signals according to each of one or more RATs.

31. The wireless device of example embodiment 29 or 30, wherein the positioning capability information includes one or more of the following:
- a current wireless device configuration with respect to multi-RAT operation;
- an indication of one or more RATs according to which the wireless device is capable of receiving or prefers to receive positioning assistance data;
- an indication one or more RATs according to which the wireless device is capable of reporting or prefers to report results of positioning measurements;
- an indication of one or more RATs for which the wireless device has a primary cell configured;
- an indication of whether the wireless device is capable of and/or prefers performing positioning measurements of signals according to multiple RATs in parallel;
- an indication of a maximum number of cells and/or frequencies for positioning measurements according to each of one or more of supported RATs;
- an indication of a set or a range of carrier frequencies for positioning measurements according to each of one or more of supported RATs;
- an indication of supported bandwidth(s) according to each of one or more of supported RATs; and
- an indication of the wireless device's numerology capability with respect to each of one or more supported RATs.

32. The wireless device of any of example embodiments 26-31, wherein the wireless device is being served by a primary cell operating according to a first RAT, wherein the processing circuitry is configured to identify a strongest cell operating according to a second RAT, differing from the first RAT, and wherein the request for assistance includes information identifying the identified strongest cell operating according to the second RAT.

33. The wireless device of example embodiment 32, wherein the processing circuitry is configured to establish a measurement gap for monitoring signals according to the second RAT, prior to identifying the strongest cell.

34. The wireless device of example embodiment 33, wherein the processing circuitry is configured to establish the measurement gap by requesting a measurement gap, via the primary cell in the first RAT.

35. The wireless device of example embodiment 33, wherein establishing the measurement gap comprises autonomously setting up the measurement gap.

36. The wireless device of any of example embodiments 26-35, wherein the request for assistance includes information describing a primary cell serving the wireless device according to a first RAT.

37. The wireless device of example embodiment 36, wherein the information describing the primary cell serving the wireless device includes one or more of:
- a cell identifier for the primary cell;
- a carrier frequency for the primary cell;
- a frequency of a serving synchronization signal block (serving SSB);
- an identifier of an SSB;
- a tracking reference signal identifier;
- an identifier of a channel-state information reference signal; and
- timing information for the primary cell.

38. The wireless device of any of example embodiments 26-37, wherein the request for assistance includes information describing one or more cells serving the wireless device other than a primary cell serving the wireless device.

39. The wireless device of any of example embodiments 26-38, wherein the positioning reference signal configuration information comprises timing information for one or more of the identified signals for measurement by the wireless device, and wherein said measuring the at least one of the identified one or more signals comprises using the timing information.

40. A location server configured to provide positioning reference signal configuration information to a wireless device, the location server comprising:
- communication circuitry configured for communicating directly or indirectly with the wireless device; and
- processing circuitry operatively associated with the communication circuitry and configured to:
  - receive, from the wireless device, a request for assistance, the request for assistance including information describing at least one cell monitored by the wireless device, or including information about the wireless device's capability to measure or preference for measuring signals transmitted according to each of one or more radio access technologies (RATs), or including both said information describing the at least one monitored cell and said information about the wireless device's capability; and
  - send to the wireless device, in response to the request for assistance, positioning reference signal configuration information, the positioning reference signal configuration information identifying one or more signals for measurement by the wireless device.

41. The location server of example embodiment 40, wherein the processing circuitry is configured to receive, from the wireless device, a report of one or more measurements of the identified one or more signals.

42. The location server of example embodiment 41, wherein the processing circuitry is configured to estimate a location for the wireless device, based on the report.

43. The location server of any of example embodiments 40-42, wherein the processing circuitry is configured to:
- send, prior to receiving the request for assistance, a request for positioning capability information for the wireless device; and
- receive, in response to the request for positioning capability information, positioning capability information for the wireless device.

44. The location server of example embodiment 43, wherein the positioning capability information indicates the wireless device's capability to measure or preference for measuring signals according to each of one or more RATs, and wherein the processing circuitry is configured to select the one or more signals for measurement by the wireless device based on the indicated capability to measure or preference for measuring signals according to each of one or more RATs.

45. The location server of example embodiment 43 or 44, wherein the positioning capability information includes one or more of the following:
- a current wireless device configuration with respect to multi-RAT operation;

an indication of one or more RATs according to which the wireless device is capable of receiving or prefers to receive positioning assistance data;

an indication one or more RATs according to which the wireless device is capable of reporting or prefers to report results of positioning measurements;

an indication of one or more RATs for which the wireless device has a primary cell configured;

an indication of whether the wireless device is capable of and/or prefers performing positioning measurements of signals according to multiple RATs in parallel;

an indication of a maximum number of cells and/or frequencies for positioning measurements according to each of one or more of supported RATs;

an indication of a set or a range of carrier frequencies for positioning measurements according to each of one or more of supported RATs;

an indication of supported bandwidth(s) according to each of one or more of supported RATs; and an indication of the wireless device's numerology capability with respect to each of one or more supported RATs.

46. The location server of any of example embodiments 40-45, wherein the request for assistance includes information identifying a cell operating according to a second RAT, differing from a first RAT according to which the wireless device is being served, and wherein the processing circuitry is configured to select the one or more signals for measurement by the wireless device based on the identified cell.

47. The location server of any of example embodiments 40-46, wherein the request for assistance includes information describing a primary cell serving the wireless device according to a first RAT, and wherein the processing circuitry is configured to select the one or more signals for measurement by the wireless device based on the information describing the primary cell.

48. The location server of example embodiment 47, wherein the information describing the primary cell serving the wireless device includes one or more of:
a cell identifier for the primary cell;
a carrier frequency for the primary cell;
a frequency of a serving synchronization signal block (serving SSB);
an identifier of an SSB;
a tracking reference signal identifier;
an identifier of a channel-state information reference signal; and
timing information for the primary cell.

49. The location server of any of example embodiments 40-48, wherein the request for assistance includes information describing one or more cells serving the wireless device other than a primary cell serving the wireless device.

50. The location server of any of example embodiments 40-49, wherein the positioning reference signal configuration information comprises timing information for one or more of the identified signals for measurement by the wireless device.

51. A non-transitory, computer-readable medium storing computer-executable instructions that, when executed by a processing circuit of a wireless device, cause the wireless device to:
send, to a location server, a request for assistance, the request for assistance including information describing at least one cell monitored by the wireless device, or including information about the wireless device's capability to measure or preference for measuring signals transmitted according to each of one or more radio access technologies (RATs), or including both said information describing the at least one monitored cell and said information about the wireless device's capability;

receive, in response to the request for assistance, positioning reference signal configuration information, the positioning reference signal configuration information identifying one or more signals for measurement by the wireless device; and measure at least one of the identified one or more signals.

52. A non-transitory, computer-readable medium storing computer-executable instructions that, when executed by a processing circuit of a location server, cause the location server to:
receive, from a wireless device, a request for assistance, the request for assistance including information describing at least one cell monitored by the wireless device, or including information about the wireless device's capability to measure or preference for measuring signals transmitted according to each of one or more radio access technologies (RATs), or including both said information describing the at least one monitored cell and said information about the wireless device's capability; and send to the wireless device, in response to the request for assistance, positioning reference signal configuration information, the positioning reference signal configuration information identifying one or more signals for measurement by the wireless device.

53. A wireless device adapted to perform a method of any of example embodiments 1 to 14.

54. A location server or one or more nodes adapted to perform a method of any of example embodiments 15 to 25.

55. A computer program product, comprising instructions that, when executed on at least one processing circuit, cause the at least one processing circuit to carry out a method according to any one of example embodiments 1 to 25.

56. A carrier containing the computer program product of example embodiment 55, wherein the carrier is one of an electronic signal, optical signal, radio signal, or computer readable storage medium.

57. A communication system including a host computer comprising:
processing circuitry configured to provide user data; and
a communication interface configured to forward the user data to a cellular network for transmission to a user equipment (UE),
wherein the cellular network comprises a base station, wherein the UE is configured to provide positioning reference signal configuration information from a location server having communication circuitry and processing circuitry, the location server's processing circuitry configured to:
receive, from the UE, a request for assistance, the request for assistance including information describing at least one cell monitored by the UE, or including information about the UE's capability to measure or preference for measuring signals transmitted according to each of one or more radio access technologies (RATs), or including both said information describing the at least one monitored cell and said information about the UE's capability; and
sending to the UE, in response to the request for assistance, positioning reference signal configuration information, the positioning reference signal configuration information identifying one or more signals for measurement by the UE.

58. The communication system of example embodiment 57, further including the base station and/or the location server.

59. The communication system of example embodiment 58, further including the UE, wherein the UE is configured to communicate directly or indirectly with the location server.

60. The communication system of example embodiment 59, wherein:
the processing circuitry of the host computer is configured to execute a host application, thereby providing the user data; and
the UE comprises processing circuitry configured to execute a client application associated with the host application.

61. A method implemented in a communication system including a host computer, a base station, a location server and a user equipment (UE), the method comprising:
at the host computer, providing user data; and
at the host computer, initiating a transmission carrying the user data to the UE via a cellular network comprising the base station, wherein the location server provides positioning reference signal configuration information to the UE, wherein the method comprises, at the location server:
receiving, from the UE, a request for assistance, the request for assistance including information describing at least one cell monitored by the UE, or including information about the UE's capability to measure or preference for measuring signals transmitted according to each of one or more radio access technologies (RATs), or including both said information describing the at least one monitored cell and said information about the UE's capability; and
sending to the UE, in response to the request for assistance, positioning reference signal configuration information, the positioning reference signal configuration information identifying one or more signals for measurement by the UE.

62. The method of example embodiment 61, further comprising:
at the base station, transmitting the user data.

63. The method of example embodiment 62, wherein the user data is provided at the host computer by executing a host application, the method further comprising:
at the UE, executing a client application associated with the host application.

64. A communication system including a host computer comprising:
processing circuitry configured to provide user data; and
a communication interface configured to forward user data to a cellular network for transmission to a user equipment (UE),
wherein the UE is configured to obtain positioning reference signal configuration information from a location server, the UE comprising a radio interface and processing circuitry configured to:
send, to the location server, a request for assistance, the request for assistance including information describing at least one cell monitored by the UE, or including information about the UE's capability to measure or preference for measuring signals transmitted according to each of one or more radio access technologies (RATs), or including both said information describing the at least one monitored cell and said information about the UE's capability;
receive, in response to the request for assistance, positioning reference signal configuration information, the positioning reference signal configuration information identifying one or more signals for measurement by the UE; and
measure at least one of the identified one or more signals.

65. The communication system of example embodiment 64, further including the UE.

66. The communication system of example embodiment 65, wherein the cellular network further includes the location server and/or a base station configured to communicate with the UE.

67. The communication system of example embodiment 65 or 66, wherein:
the processing circuitry of the host computer is configured to execute a host application, thereby providing the user data; and
the UE's processing circuitry is configured to execute a client application associated with the host application.

68. A method implemented in a communication system including a host computer, a base station, a location server and a user equipment (UE), the method comprising:
at the host computer, providing user data; and
at the host computer, initiating a transmission carrying the user data to the UE via a cellular network comprising the base station, wherein the UE obtains positioning reference signal configuration information from the location server and the method comprises, at the UE:
sending, to the location server, a request for assistance, the request for assistance including information describing at least one cell monitored by the wireless device, or including information about the wireless device's capability to measure or preference for measuring signals transmitted according to each of one or more radio access technologies (RATs), or including both said information describing the at least one monitored cell and said information about the wireless device's capability;
receiving, in response to the request for assistance, positioning reference signal configuration information, the positioning reference signal configuration information identifying one or more signals for measurement by the wireless device; and
measuring at least one of the identified one or more signals.

69. The method of example embodiment 68, further comprising:
at the UE, receiving the user data from the base station.

70. A communication system including a host computer comprising:
a communication interface configured to receive user data originating from a transmission from a user equipment (UE) to a base station,
wherein the UE is configured to obtain positioning reference signal configuration information from a location server and comprises a radio interface and processing circuitry, the UE's processing circuitry configured to:
send, to the location server, a request for assistance, the request for assistance including information describing at least one cell monitored by the UE, or including information about the UE's capability to measure or preference for measuring signals transmitted according to each of one or more radio access technologies (RATs), or including both said information describing the at least one monitored cell and said information about the UE's capability;

receive, in response to the request for assistance, positioning reference signal configuration information, the positioning reference signal configuration information identifying one or more signals for measurement by the UE; and measure at least one of the identified one or more signals.

71. The communication system of example embodiment 70, further including the UE.

72. The communication system of example embodiment 71, further including the location server and/or the base station, wherein the base station comprises a radio interface configured to communicate with the UE and a communication interface configured to forward to the host computer the user data carried by a transmission from the UE to the base station.

73. The communication system of example embodiment 71 or 72, wherein:
the processing circuitry of the host computer is configured to execute a host application; and
the UE's processing circuitry is configured to execute a client application associated with the host application, thereby providing the user data.

74. The communication system of example embodiment 71 or 72, wherein:
the processing circuitry of the host computer is configured to execute a host application, thereby providing request data; and
the UE's processing circuitry is configured to execute a client application associated with the host application, thereby providing the user data in response to the request data.

75. A method implemented in a user equipment (UE) that obtains positioning reference signal configuration information, comprising:
sending, to a location server, a request for assistance, the request for assistance including information describing at least one cell monitored by the UE, or including information about the UE's capability to measure or preference for measuring signals transmitted according to each of one or more radio access technologies (RATs), or including both said information describing the at least one monitored cell and said information about the UE's capability;
receiving, in response to the request for assistance, positioning reference signal configuration information, the positioning reference signal configuration information identifying one or more signals for measurement by the UE; and
measuring at least one of the identified one or more signals.

76. The method of example embodiment 75, further comprising:
providing user data; and
forwarding the user data to a host computer via the transmission to the base station.

77. A method implemented in a communication system including a host computer, a base station, a location server and a user equipment (UE), the method comprising:
at the host computer, receiving user data transmitted to the base station from the UE, wherein the method comprises, at the UE:
sending, to the location server, a request for assistance, the request for assistance including information describing at least one cell monitored by the UE, or including information about the UE's capability to measure or preference for measuring signals transmitted according to each of one or more radio access technologies (RATs), or including both said information describing the at least one monitored cell and said information about the UE's capability;
receiving, in response to the request for assistance, positioning reference signal configuration information, the positioning reference signal configuration information identifying one or more signals for measurement by the UE; and
measuring at least one of the identified one or more signals.

78. The method of example embodiment 77, further comprising:
at the UE, providing the user data to the base station.

79. The method of example embodiment 78, further comprising:
at the UE, executing a client application, thereby providing the user data to be transmitted; and
at the host computer, executing a host application associated with the client application.

80. The method of example embodiment 78, further comprising:
at the UE, executing a client application; and
at the UE, receiving input data to the client application, the input data being provided at the host computer by executing a host application associated with the client application,
wherein the user data to be transmitted is provided by the client application in response to the input data.

81. A communication system including a host computer comprising a communication interface configured to receive user data originating from a transmission from a user equipment (UE) to a base station, wherein a location server is configured to provide positioning reference signal configuration information to the UE, the location server comprising communication circuitry and processing circuitry configured to:
receive, from the UE, a request for assistance, the request for assistance including information describing at least one cell monitored by the UE, or including information about the UE's capability to measure or preference for measuring signals transmitted according to each of one or more radio access technologies (RATs), or including both said information describing the at least one monitored cell and said information about the UE's capability; and
send to the UE, in response to the request for assistance, positioning reference signal configuration information, the positioning reference signal configuration information identifying one or more signals for measurement by the UE.

82. The communication system of example embodiment 81, further including the base station.

83. The communication system of example embodiment 82, further including the UE, wherein the UE is configured to communicate directly or indirectly with the location server and the base station.

84. The communication system of example embodiment 83, wherein:
the processing circuitry of the host computer is configured to execute a host application;
the UE is configured to execute a client application associated with the host application, thereby providing the user data to be received by the host computer.

85. A method implemented in a communication system including a host computer, a base station, a location server and a user equipment (UE), the method comprising:

at the host computer, receiving, from the base station, user data originating from a transmission which the base station has received from the UE, wherein the UE obtains positioning reference signal configuration information, and wherein the method comprises, at the location server:

receiving, from the UE, a request for assistance, the request for assistance including information describing at least one cell monitored by the UE, or including information about the UE's capability to measure or preference for measuring signals transmitted according to each of one or more radio access technologies (RATs), or including both said information describing the at least one monitored cell and said information about the UE's capability; and sending to the UE, in response to the request for assistance, positioning reference signal configuration information, the positioning reference signal configuration information identifying one or more signals for measurement by the UE.

86. The method of example embodiment 85, further comprising:
at the base station, receiving the user data from the UE.

87. The method of example embodiment 86, further comprising:
at the base station, initiating a transmission of the received user data to the host computer.

88. A wireless device configured to obtain positioning reference signal configuration information, the wireless device comprising:
a sending module for sending, to a location server, a request for assistance, the request for assistance including information describing at least one cell monitored by the wireless device, or including information about the wireless device's capability to measure or preference for measuring signals transmitted according to each of one or more radio access technologies (RATs), or including both said information describing the at least one monitored cell and said information about the wireless device's capability;
a receiving module for receiving, in response to the request for assistance, positioning reference signal configuration information, the positioning reference signal configuration information identifying one or more signals for measurement by the wireless device; and
a measuring module for measuring at least one of the identified one or more signals.

89. A location server configured to provide positioning reference signal configuration information to a wireless device, the location server comprising:
a receiving module for receiving, from the wireless device, a request for assistance, the request for assistance including information describing at least one cell monitored by the wireless device, or including information about the wireless device's capability to measure or preference for measuring signals transmitted according to each of one or more radio access technologies (RATs), or including both said information describing the at least one monitored cell and said information about the wireless device's capability; and
a sending module for sending to the wireless device, in response to the request for assistance, positioning reference signal configuration information, the positioning reference signal configuration information identifying one or more signals for measurement by the wireless device.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts is to be determined by the broadest permissible interpretation of the present disclosure including the preceding examples of embodiments, the following claims, and their equivalents, and shall not be restricted or limited by the foregoing detailed description.

What is claimed is:

1. A method, in a wireless device, for obtaining positioning reference signal configuration information, the method comprising:
sending, to a location server, a request for assistance, the request for assistance comprising information about a cell serving the wireless device according to a first radio access technology (RAT);
receiving, in response to the request for assistance, positioning reference signal configuration information, the positioning reference signal configuration information identifying one or more signals transmitted according to a second RAT, for measurement by the wireless device; and
measuring at least one of the identified one or more signals.

2. The method of claim 1, further comprising reporting one or more measurements for the measured signal or signals.

3. The method of claim 1, further comprising estimating a location for the wireless device, based on one or more measurements for the measured signal or signals.

4. The method of claim 1, wherein said measuring comprises measuring relative time differences between different reference signals.

5. The method of claim 1, wherein the method further comprises sending capability information indicating the wireless device's capability to perform positioning measurements for one or more RATs other than the first RAT.

6. The method of claim 5, wherein the positioning capability information includes one or more of the following:
a current wireless device configuration with respect to multi-RAT operation;
an indication of one or more RATs according to which the wireless device is capable of receiving or prefers to receive positioning assistance data;
an indication of one or more RATs according to which the wireless device is capable of reporting or prefers to report results of positioning measurements;
an indication of one or more RATs for which the wireless device has a primary cell configured;
an indication of whether the wireless device is capable of and/or prefers performing positioning measurements of signals according to multiple RATs in parallel;
an indication of a maximum number of cells and/or frequencies for positioning measurements according to each of one or more of supported RATs;
an indication of a set or a range of carrier frequencies for positioning measurements according to each of one or more of supported RATs;

an indication of supported bandwidth(s) according to each of one or more of supported RATs; and an indication of the wireless device's numerology capability with respect to each of one or more supported RATs.

7. The method of claim 1, wherein the method further comprises establishing a measurement gap for monitoring signals according to the second RAT, wherein establishing the measurement gap comprises requesting a measurement gap, via the cell serving the wireless device according to the first RAT, or autonomously setting up the measurement gap.

8. The method of claim 1, wherein the wireless device is being served by a primary cell operating according to a first RAT, wherein the method further comprises identifying a strongest cell operating according to the second RAT, and wherein the request for assistance includes information identifying the identified strongest cell operating according to the second RAT.

9. The method of claim 1, wherein the request for assistance includes information describing a primary cell serving the wireless device according to a first RAT.

10. The method of claim 9, wherein the information describing the primary cell serving the wireless device includes one or more of:
    a cell identifier for the primary cell;
    a carrier frequency for the primary cell;
    a frequency of a serving synchronization signal block (serving SSB);
    an identifier of an SSB;
    a tracking reference signal identifier;
    an identifier of a channel-state information reference signal; and
    timing information for the primary cell.

11. The method of claim 1, wherein the request for assistance includes information describing one or more cells serving the wireless device other than a primary cell serving the wireless device.

12. The method of claim 1, wherein the positioning reference signal configuration information comprises timing information for one or more of the identified signals for measurement by the wireless device, and wherein said measuring the at least one of the identified one or more signals comprises using the timing information.

13. The method of claim 12, wherein the timing information is an offset between a timing of the first RAT and a timing of the second RAT.

14. A method, in a location server, for providing positioning reference signal configuration information to a wireless device, the method comprising:
    receiving, from the wireless device, a request for assistance, the request for assistance including information comprising information about a cell serving the wireless device according to a first radio access technology (RAT); and
    sending to the wireless device, in response to the request for assistance, positioning reference signal configuration information, the positioning reference signal configuration information identifying one or more signals transmitted according to a second RAT, for measurement by the wireless device.

15. The method of claim 14, further comprising receiving, from the wireless device, a report of one or more measurements of the identified one or more signals.

16. The method of claim 15, further comprising estimating a location for the wireless device, based on the report.

17. The method of claim 14, wherein the method further comprises:
    receiving, from the wireless device, capability information indicating the wireless device's capability to perform positioning measurements for one or more RATs other than the first RAT; and
    selecting the one or more signals based on the received capability information.

18. The method of claim 14, wherein the positioning reference signal configuration information comprises timing information for one or more of the identified signals for measurement by the wireless device.

19. The method of claim 18, wherein the timing information is an offset between a timing of the first RAT and a timing of the second RAT.

20. A wireless device configured to obtain positioning reference signal configuration information, the wireless device comprising:
    transceiver circuitry configured for communicating directly or indirectly with a location server and one or more wireless communication networks; and
    processing circuitry operatively associated with the transceiver circuitry and configured to:
        send, to a location server, a request for assistance, the request for assistance comprising information about a cell serving the wireless device according to a first radio access technology (RAT);
        receive, in response to the request for assistance, positioning reference signal configuration information, the positioning reference signal configuration information identifying one or more signals transmitted according to a second RAT, for measurement by the wireless device; and
        measure at least one of the identified one or more signals.

21. The wireless device of claim 20, wherein the processing circuitry is further configured to report one or more measurements for the measured signal or signals.

22. The wireless device of claim 20, wherein the processing circuitry is further configured to estimate a location for the wireless device, based on one or more measurements for the measured signal or signals.

23. The wireless device of claim 20, wherein said one or more measurements comprise measurements of relative time differences between different reference signals.

24. The wireless device of claim 20, wherein the wireless device is being served by a primary cell operating according to a first RAT, wherein the wireless device is further adapted to identify a strongest cell operating according to the second RAT, and wherein the request for assistance includes information identifying the identified strongest cell operating according to the second RAT.

25. A location server configured to provide positioning reference signal configuration information to a wireless device, the location server comprising:
    communication circuitry configured for communicating directly or indirectly with the wireless device; and
    processing circuitry operatively associated with the communication circuitry and configured to:
        receive, from the wireless device, a request for assistance, the request for assistance including information comprising information about a cell serving the wireless device according to a first radio access technology (RAT); and
        send to the wireless device, in response to the request for assistance, positioning reference signal configuration information, the positioning reference signal configuration information identifying one or more signals transmitted according to a second RAT, for measurement by the wireless device.

26. The location server of claim 25, wherein the processing circuitry is further configured to receive, from the wireless device, a report of one or more measurements of the identified one or more signals, and to estimate a location for the wireless device, based on the report.

\* \* \* \* \*